(12) United States Patent
Okamoto et al.

(10) Patent No.: US 9,380,279 B2
(45) Date of Patent: Jun. 28, 2016

(54) ILLUMINATION DEVICE AND PROJECTOR

(71) Applicant: SEIKO EPSON CORPORATION, Tokyo (JP)

(72) Inventors: Junichi Okamoto, Fujimi-machi (JP); Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 367 days.

(21) Appl. No.: 14/174,092

(22) Filed: Feb. 6, 2014

(65) Prior Publication Data

US 2014/0232996 A1 Aug. 21, 2014

(30) Foreign Application Priority Data

Feb. 15, 2013 (JP) ................... 2013-028285

(51) Int. Cl.
*H04N 9/31* (2006.01)
*G03B 21/20* (2006.01)
*G02B 27/48* (2006.01)

(52) U.S. Cl.
CPC ............. *H04N 9/3155* (2013.01); *G02B 27/48* (2013.01); *G03B 21/208* (2013.01); *G03B 21/2013* (2013.01); *G03B 21/2033* (2013.01); *G03B 21/2053* (2013.01); *H04N 9/3161* (2013.01); *H04N 9/3197* (2013.01)

(58) Field of Classification Search
CPC ... H04N 9/315; H04N 9/3164; H04N 9/3155; H04N 9/3197; G09G 3/3406; G09G 3/342; G03B 21/2053; G03B 21/2033; G03B 21/2013; G03B 27/48; H05B 33/0833

USPC ............ 353/38, 85; 362/97.2, 97.3, 227, 230, 362/234, 244, 249.02
See application file for complete search history.

(56) References Cited

U.S. PATENT DOCUMENTS

| | | | | |
|---|---|---|---|---|
| 7,252,392 | B2 * | 8/2007 | Matsui | H04N 9/315 348/E9.027 |
| 8,870,387 | B2 * | 10/2014 | Toyooka | G03B 21/14 313/498 |
| 2009/0175302 | A1 | 7/2009 | Bazzani et al. | |
| 2009/0257029 | A1 | 10/2009 | Mizushima et al. | |

FOREIGN PATENT DOCUMENTS

| | | |
|---|---|---|
| JP | A-2007-121842 | 5/2007 |
| JP | A-2009-53370 | 3/2009 |
| JP | A-2009-146941 | 7/2009 |
| JP | A-2009-216843 | 9/2009 |

(Continued)

*Primary Examiner* — William C Dowling
(74) *Attorney, Agent, or Firm* — Oliff PLC

(57) ABSTRACT

An illumination device includes a light source device which has a plurality of light emission regions including a first light emission region and a second light emission region, and is able to adjust the amount of light emitted from each of the plurality of light emission regions, a light source control device which controls the light source device such that, in a first period, the amount of light emitted from the first light emission region is different from the amount of light emitted from other light emission regions among the plurality of light emission regions, and in a second period, the amount of light emitted from the second light emission region is different from the amount of light emitted from the second light emission region in the first period, and an illumination optical system which superimposes light from the plurality of light emission regions in an illumination region.

20 Claims, 17 Drawing Sheets

(56) References Cited

FOREIGN PATENT DOCUMENTS

| JP | A-2010-91898 | 4/2010 |
| JP | A-2011-508982 | 3/2011 |
| JP | B2-4987720 | 7/2012 |
| WO | WO 2007/032216 A1 | 3/2007 |
| WO | WO 2009/088453 A2 | 7/2009 |

* cited by examiner

ILLUMINATION DEVICE AND PROJECTOR

BACKGROUND

1. Technical Field

The present invention relates to an illumination device and a projector.

2. Related Art

A projector has been hitherto known as one of display devices (for example, see JP-A-2009-216843). For example, the projector modulates light from an illumination device using a light modulation device to form an image and projects the image onto a screen using a projection lens or the like.

As a light source of the illumination device, various light sources are used, and a coherent light source which emits light (coherent light) having coherence may be used. The coherent light source includes a solid-state light source using a laser diode (LD) or a super luminescence diode (SLD), a short-arc lamp light source, and the like. For example, in a projector using a laser light source, it is possible to sufficiently expand a color reproduction range since the wavelength band of the laser light source is narrow, and to achieve reduction in size or to reduce the number of constituent components.

On the other hand, if display is performed by a projector using a coherent light source, an observer who observes an image may recognize so-called speckle. Speckle is a pattern in which bright points and dark points are distributed in a striped pattern or a spotted pattern due to interference of light, gives a sense of glare to the observer, and gives a sense of discomfort during image viewing. For this reason, a technique which makes speckle be less recognizable (hereinafter, "reduces" speckle) is expected to be devised.

As one of techniques for reducing speckle, JP-A-2009-216843 suggests a technique which rotates a spot formed on a pupil plane of a projection lens around an optical axis on the pupil plane. According to the technique of JP-A-2009-216843, the angular distribution of light rays entering respective points on a screen temporally changes, and the pattern of speckle temporally changes. As a result, the observer observes speckle in a superimposed (integrated) manner, and speckle is reduced.

In the above-described technique, in the course of effectively reducing speckle, there is room for improvement. For example, according to a method which moves a pupil image on a pupil plane, since there is no change in the pattern of the pupil image itself, it is not possible to sufficiently reduce speckle. Since it is necessary to increase the effective pupil (effective diameter) of the projection lens, an increase in the size of the projection lens and an increase in cost occur.

SUMMARY

An advantage of some aspects of the invention is that it provides an illumination device capable of effectively reducing speckle and a projector.

An illumination device according to a first aspect of the invention includes a light source device which has a plurality of light emission regions including a first light emission region and a second light emission region, and is able to adjust the amount of light emitted from each of the plurality of light emission regions, a light source control device which controls the light source device such that, in a first period, the amount of light emitted from the first light emission region is different from the amount of light emitted from other light emission regions among the plurality of light emission regions, and in a second period, the amount of light emitted from the second light emission region is different from the amount of light emitted from the second light emission region in the first period, and an illumination optical system which superimposes light from the plurality of light emission regions in an illumination region.

In this illumination device, since light is emitted from different light emission regions in the first period and the second period, and light emitted from all light emission regions enters the illumination region, the angular distribution of light entering the illumination region changes between the first period and the second period. For this reason, the pattern of speckle changes between the first period and the second period, and the pattern of speckle is less visible.

The illumination device of the first aspect may be configured such that, in the first period, the intensity of light emitted from the first light emission region is set to at least two intensity levels.

In the illumination device of this configuration, since the angular distribution of light entering the illumination region changes in the first period, the pattern of speckle is less visible.

The illumination device of the first aspect may be configured such that the light source device includes a plurality of light sources, and the light source control device makes the amount of light emission of at least one light source of the plurality of light sources different between the first period and the second period.

In the illumination device of this configuration, it is possible to make the amount of light emitted from a light emission region corresponding to a light source with change in the amount of light emission different between the first period and the second period.

The illumination device of the first aspect may be configured such that, in the first period, the light source control device decreases supply power to a first light source among the plurality of light sources and increases supply power to a second light source adjacent to the first light source among the plurality of light sources greater than supply power to other light sources among the plurality of light sources.

In the illumination device of this configuration, in the first period, it is possible to suppress a decrease in the amount of light emitted from the light source device.

The illumination device of the first aspect may be configured such that the light source control device decreases or increases supply power to at least two adjacent light sources among the plurality of light sources concurrently during transition from the first period to the second period.

In the illumination device of this configuration, since supply power to each of at least two adjacent light sources decreases or increases concurrently, it is possible to increase change in the angular distribution of light when light enters the illumination region.

The illumination device of the first aspect may be configured such that, when the amount of light emitted from the light source device when predetermined power is supplied to each of the plurality of light sources is defined as a reference amount of light, power greater than the predetermined power is supplied to at least one light source other than the first light source among the plurality of light sources so as to reduce the amount of decrease of the amount of light emitted from the light source device from the reference amount of light when a first light source among the plurality of light sources is turned off.

In the illumination device of this configuration, it is possible to suppress a decrease in the amount of light emitted from the light source device when the first light source is turned off.

The illumination device of the first aspect may be configured such that the light source control device controls the light source device such that the amount of light emitted from the plurality of light emission regions is identical in the first period and the second period.

In the illumination device of this configuration, it is possible to make the brightness of the illumination region substantially identical in the first period and the second period.

The illumination device of the first aspect may be configured such that each of the first period and the second period is equal to or smaller than 1/24 seconds.

In the illumination device of this configuration, since the pattern of speckle in the first period and the pattern of speckle in the second period are less likely to be visible, it is possible to significantly reduce speckle.

The illumination device of the first aspect may be configured such that the light source device includes a solid-state light source which emits light having coherence.

In the illumination device of this configuration, it is easy to temporally change the amount of light emitted from the light emission regions.

The illumination device of the first aspect may be configured such that the illumination optical system includes a lens array which includes a lens element, through which light from the light source device enters, and a superimposing lens which superimposes light from the lens element on the illumination region.

In the illumination device of this configuration, it is possible to reduce speckle while uniformizing the illuminance distribution in the illumination region.

The illumination device of the first aspect may be configured such that the illumination optical system includes an optical rod which has an entrance end surface, through which light from the light source device enters, and an emission end surface, through which light passing through the entrance end surface is emitted, and a relay system which establishes an optically conjugate relationship between the emission end surface of the optical rod and the illumination region.

In the illumination device of this configuration, it is possible to reduce speckle while uniformizing the illuminance distribution in the illumination region.

A projector according to a second aspect of the invention includes the illumination device of the first aspect, an image forming system which forms an image by light from the illumination device, and a projection system which projects the image formed by the image forming system.

In this projector, since speckle is less visible by an observer of an image, it is possible to express an image with high quality.

The projector of the second aspect may be configured such that the image forming system includes a first microlens which is provided for each of a plurality of pixels arranged in the illumination region, and a second microlens which constitutes an afocal optical system along with the first microlens.

In the projector of this configuration, since change in the angular distribution of light, which represents an image, caused by the image forming system is suppressed, it is possible to control the angular distribution of light entering each point on a projection surface, on which an image is projected, with high precision, thereby effectively reducing speckle.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment will be described. First, the outline of a projector of this embodiment will be described, and then, the details of respective units, such as an illumination device, of a projector will be described.

Figure 1:
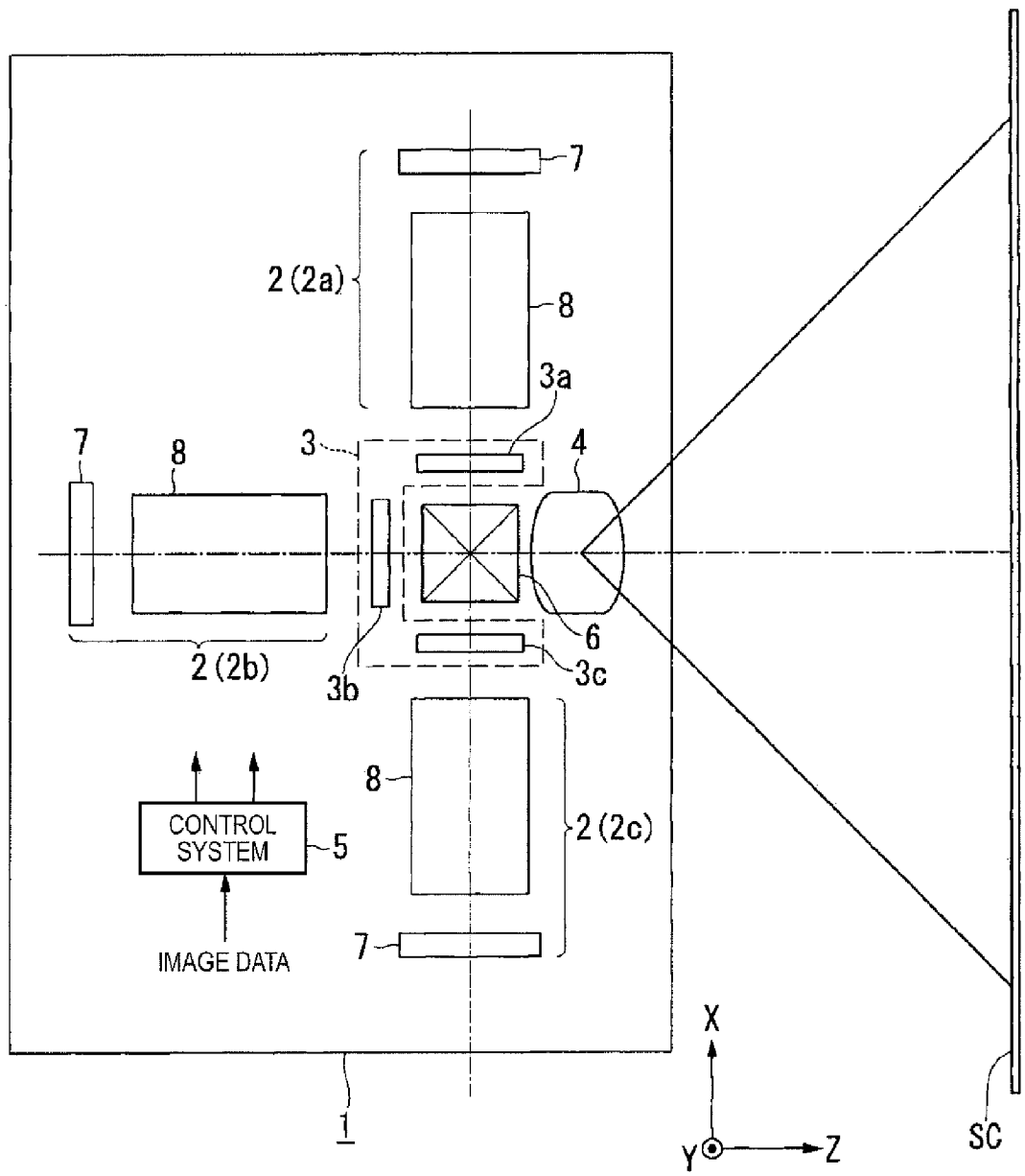
FIG. 1 is a diagram showing a projector of a first embodiment.

FIG. 1 is a diagram showing a projector 1 of a first embodiment. The projector 1 forms an image according to image data supplied from a signal source, such as a DVD player or a PC, and projects the formed image on a projection surface SC (display screen), such as a screen or a wall.

The projector 1 includes an illumination system 2, an image forming system 3 which forms an image using illumination light from the illumination system 2, a projection system 4 which projects the image formed by the image forming system 3, and a control system 5 which controls the respective units of the projector 1. The projector 1 of this embodiment is a so-called three-plate projector which individually forms images of respective colors of red, green, and blue (RGB), and composes (spatially superimposes) the formed images of the three colors by a color composition system 6, thereby expressing a full color image.

The illumination system 2 includes an illumination device 2a which emits red illumination light, an illumination device 2b which emits green illumination light, and an illumination device 2c which emits blue illumination light. These illumination devices have the same configuration, and each illumination device includes a light source device 7 and an illumination optical system 8.

The image forming system 3 includes an image forming apparatus 3a which forms a red image, an image forming apparatus 3b which forms a green image, and an image forming apparatus 3c which forms a blue image. The illumination devices for the respective colors of the illumination system 2 and the image forming apparatuses correspond to each other on a one-to-one basis.

Each image forming apparatus forms an image of the corresponding color using illumination light from the corresponding illumination device, and emits image light according to the image of the corresponding color. For example, the image forming apparatus 3a for red forms a red image using illumination light (red light) from the illumination device 2a for red. The image forming apparatus 3a emits light (image light) according to an image. Similarly to the image forming apparatus 3a for red, the image forming apparatus for color other than red emits image light of the corresponding color according to the formed image of the corresponding color.

Image light of the respective colors emitted from the image forming system 3 enters the color composition system 6. The color composition system 6 is, for example, a dichroic prism, and includes two wavelength separation films which reflect or transmit incident light according to the wavelength of incident light. One wavelength separation film has a characteristic for transmitting red light and green light and for reflecting blue light. The other wavelength separation film has a characteristic for transmitting green light and blue light and for reflecting red light.

Respective color light which enters the color composition system 6 from the image forming system 3 is emitted from the color composition system 6 in a state of that travelling direction of each color light is aligned in the same direction by reflection or transmission in the wavelength separation films. Image light emitted from the color composition system 6 enters the projection system 4.

The projection system 4 is a so-called projection lens, and magnifies and projects the image formed by the image forming system 3 on the projection surface SC.

Next, the respective units of the projector 1 will be described in more detail. In this embodiment, the illumination devices for the respective colors have the same configuration, and the image forming apparatuses for the respective colors have the same configuration. For this reason, the configuration of the system corresponding to the green image will be representatively described, and description of the systems corresponding to the images of other colors will be simplified or omitted.

Figure 2:
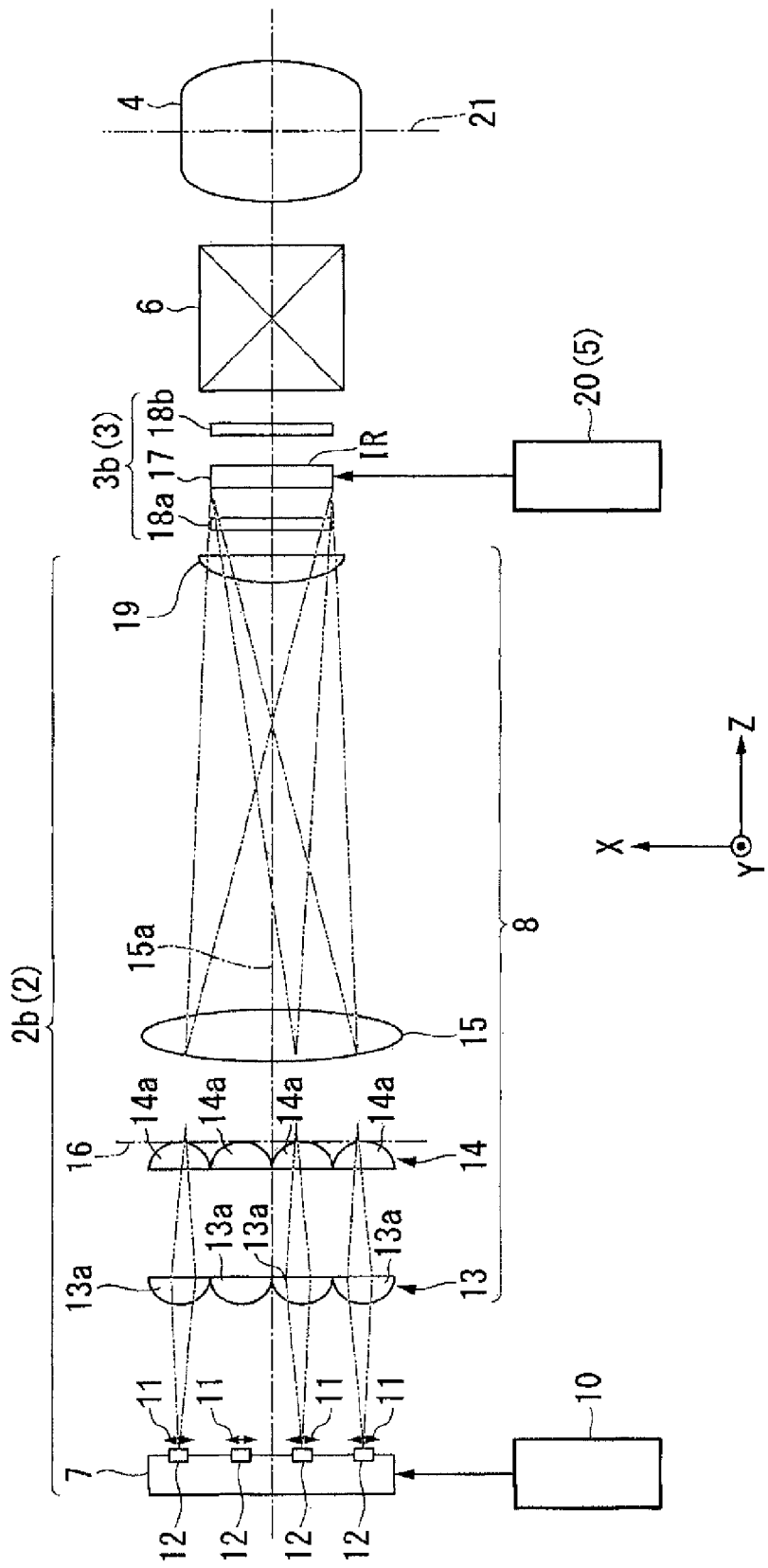
FIG. 2 is a diagram showing an illumination device, an image forming apparatus, a color composition system, and a projection system.

FIG. 2 is a diagram showing the illumination device 2b, the image forming apparatus 3b, the color composition system 6, and the projection system 4. The illumination device 2b illuminates a region, where a plurality of pixels are arranged, of the image forming apparatus 3b with substantially uniform brightness by a Kohler illumination method or the like.

The illumination device 2b includes a light source device 7, an illumination optical system 8, and a light source control device 10. The light source device 7 is controlled by the light source control device 10 and emits light having coherence. The illumination optical system 8 uniformizes the illuminance distribution of light from the light source device 7 in an illumination region IR (image forming apparatus 3b).

The light source device 7 has a plurality of light emission regions 11 which emit coherent light, and is able to adjust the amount of light (hereinafter, referred to as the amount of cell light) emitted from each of the light emission regions 11. The light source device 7 is a so-called laser light source array, and includes a plurality of laser light sources (laser diodes) 12 arranged in a two-dimensional manner. In the light source device 7, each of a plurality of light emission regions 11 corresponds to the light emission port of each laser light source 12.

The laser light source 12 is a solid-state light source which emits laser light (coherent light) having the amount of light according to supply power. For this reason, the light source device 7 adjusts supply power to each laser light source 12 to adjust the amount of light emission per unit time of each laser light source 12, that is, the amount of light (the amount of cell light) emitted from each light emission region 11.

The amount of cell light is a concept including zero (0), and for example, in a state where power is not supplied to the laser light source 12 and the laser light source is turned off, the amount of cell light is zero (0). That is, the amount of cell light can be adjusted by switching between a turn-on state and a turn-off state of the laser light source 12 and by decreasing the amount of light emission while the laser light source 12 is turned on.

The light source control device 10 controls supply power to each laser light source 12 of the light source device 7 to control the amount of light emission (the amount of cell light) of each laser light source 12 (light emission region 11). For example, the light source control device 10 starts power supply to the laser light source 12 to switch the laser light source 12 from the turn-off state to the turn-on state. The light source control device 10 stops power supply to the laser light source 12 to switch the laser light source 12 from the turn-on state to the turn-off state.

The light source control device 10 increases or decreases supply power to the laser light source 12 when the laser light source 12 is turned on to increase or decrease the amount of light emission of the laser light source 12. When the laser light source 12 is pulse-driven, as a method of increasing or decreasing supply power, one or both of a method (for example, amplitude modulation) of increasing or decreasing a current value supplied to the laser light source 12 and a method (pulse width modulation) of increasing or decreasing the duration in which a current is supplied to the laser light source 12 may be used.

The illumination optical system 8 includes a fly-eye lens 13, a fly-eye lens 14, a superimposing lens 15, and a field lens 19.

The fly-eye lens 13 includes a plurality of lens elements 13a arranged on a predetermined plane in a two-dimensional manner. The predetermined plane on which the lens elements 13a are arranged is substantially parallel to a plane (hereinafter, referred to as a laser arrangement plane) on which a plurality of laser light sources 12 are arranged in the light source device 7. Each of the plurality of lens elements 13a forms a plane (hereinafter, referred to as a first conjugate plane 16) which is optically conjugated with the laser arrangement plane. In other words, each of the lens elements 13a forms a light source image (secondary light source) on the first conjugate plane 16.

The fly-eye lens 14 includes a plurality of lens elements 14a arranged in a two-dimensional manner. A plane on which the lens elements 14a are arranged is arranged at or near the position of the first conjugate plane 16 formed by the fly-eye lens 13. A light source image is formed on each of the lens elements 14a of the fly-eye lens 14, and a light emission pattern including a plurality of light source images is formed on the fly-eye lens 14 (first conjugate plane 16).

The superimposing lens 15 superimposes light emitted from each of the lens elements 14a of the fly-eye lens 14 in substantially the same region (illumination region IR). The superimposing lens 15 includes one or two or more lenses, such as a spherical lens or an aspherical lens, which are rotationally symmetrical around a predetermined axis. The predetermined axis corresponds to an optical axis 15a of the superimposing lens 15 (an optical axis of the illumination optical system 8), and is substantially perpendicular to the laser arrangement plane of the light source device 7 and the first conjugate plane formed by the fly-eye lens 13. The field lens 19 is provided in the optical path between the superimposing lens 15 and the illumination region IR.

The illumination optical system 8 having the above-described configuration divides light emitted from the light source device 7 into a plurality of partial light fluxes for each lens element 13a of the fly-eye lens 13. The illumination optical system 8 superimposes the plurality of partial light fluxes divided by the fly-eye lens 13 on the illumination region IR by the superimposing lens 15. For this reason, the illuminance distribution on the illumination region IR is made uniform.

The image forming apparatus 3b of FIG. 2 is, for example, a transmission type liquid crystal light valve, and includes a liquid crystal panel 17 which has a plurality of pixels, a polarizing plate 18a which is arranged on the entrance side of the liquid crystal panel 17 (the light source device 7 side), and a polarizing plate 18b which is arranged on the emission side of the liquid crystal panel 17 (the projection system 4 side). The field lens 19 is arranged near the illumination region IR on the entrance side of the polarizing plate 18a.

For example, the emission-side polarizing plate 18b is arranged such that the transmission axis is orthogonal to the transmission axis of the entrance-side polarizing plate 18a. An image control device 20 controls the liquid crystal panel 17 on the basis of image data to control the polarization state of light passing through each pixel, thereby controlling transmittance of the polarizing plate 18a, the liquid crystal panel 17, and the polarizing plate 18b for each pixel. In this way, the image forming apparatus 3b forms an image specified in image data.

As described referring to FIG. 1, image light emitted from the image forming apparatus 3b enters the projection system 4 through the color composition system 6. The projection system 4 forms an image plane which is optically conjugated with the image forming apparatus 3b (object surface), and the image formed by the image forming apparatus 3b is projected on the projection surface SC arranged on the image plane.

In the projection system 4, a second conjugate plane 21 which is optically conjugated with the light source image (fly-eye lens 14) as a source of illumination light is formed. The second conjugate plane 21 is a so-called pupil plane, and in the second conjugate plane 21, the spots (referred to as a pupil image, an angle image, or the like) of a pattern according to the angular distribution of light emitted from the image forming apparatus 3b are formed.

By the way, when forming an image using light having coherence as illumination, for example, a pattern (speckle) in which bright points and dark points are distributed in a striped pattern or a spotted pattern may be visible due to interference of image light passing through the projection surface SC. If speckle is visible by an observer of an image, speckle gives a sense of glare to the observer, and quality of image display is degraded.

As one of the methods of making speckle be less visible, a time multiplexing method which temporally changes the pattern of speckle on the screen is provided. In this method, the pattern of speckle changes at a frequency (for example, equal to or higher than 24 Hz) so as not to be visible by the observer, whereby contrast of temporally integrated speckle is degraded, and a specific light-dark pattern is less visible by the observer. For example, if the speckle pattern is changed among uncorrelated speckle patterns N times within 1/24 seconds or less, contrast of speckle is degraded to $1/\sqrt{N}$.

Figure 3:
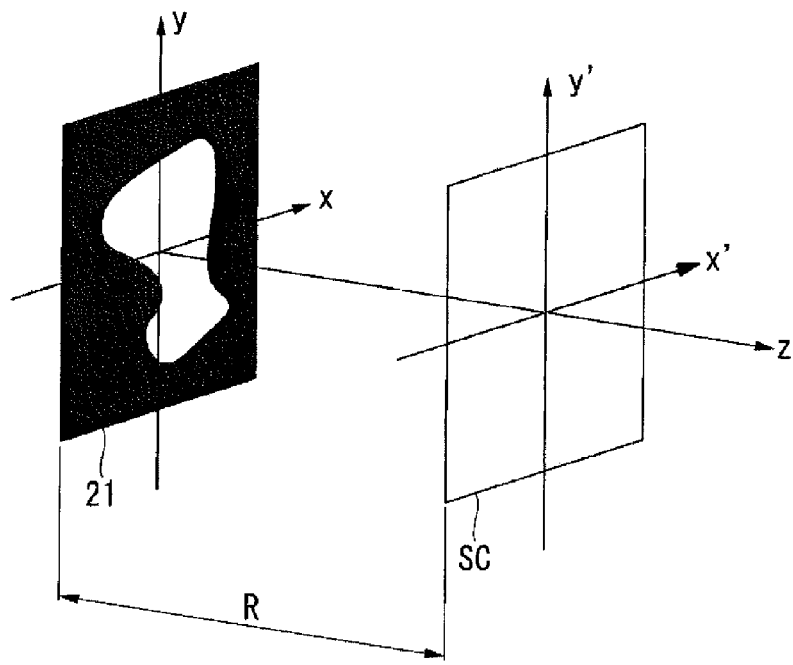
FIG. 3 is a diagram illustrating the definition of parameters in an equation for Fresnel diffraction.

The pattern of speckle will be described referring to FIG. 3 and Expression (1). FIG. 3 is a diagram illustrating the definition of parameters in an equation for Fresnel diffraction (Expression (1)).

$$u(x',y') = \frac{A}{i\lambda R}e^{ikR}\int\int f(x,y)e^{\frac{ik}{2R}[(x-x')^2+(y-y')^2]}dxdy \quad (1)$$

In FIG. 3, reference numerals x and y denote the coordinates on the second conjugate plane 21 (the pupil plane of the projection system 4), and reference numerals x' and y' denote the coordinates on the projection surface SC (screen). For convenience of description, it is assumed that the second conjugate plane 21 and the projection surface SC are parallel to the XY plane (see FIG. 2). The XY plane is a plane which is orthogonal to the optical axis 15a. Reference numeral R in FIG. 3 denotes the distance between the second conjugate plane 21 and the projection surface SC.

Expression (1) is a so-called equation for Fresnel diffraction, u(x',y') on the left side represents an amplitude distribution on the projection surface SC, A on the right side represents amplitude, i represents an imaginary unit, k represents a wave number (propagation coefficient), λ represents the wavelength of image light, and f (x, y) represents an aperture function. Since the pattern of speckle has a correspondence relationship with the amplitude distribution u(x',y') on the projection surface SC, it is inferred that the pattern of speckle changes according to the aperture function f(x,y). In this embodiment, the aperture function f(x,y) representing the light-dark pattern on the second conjugate plane 21 temporally changes to change the pattern of speckle, thereby reducing speckle.

Figure 4:
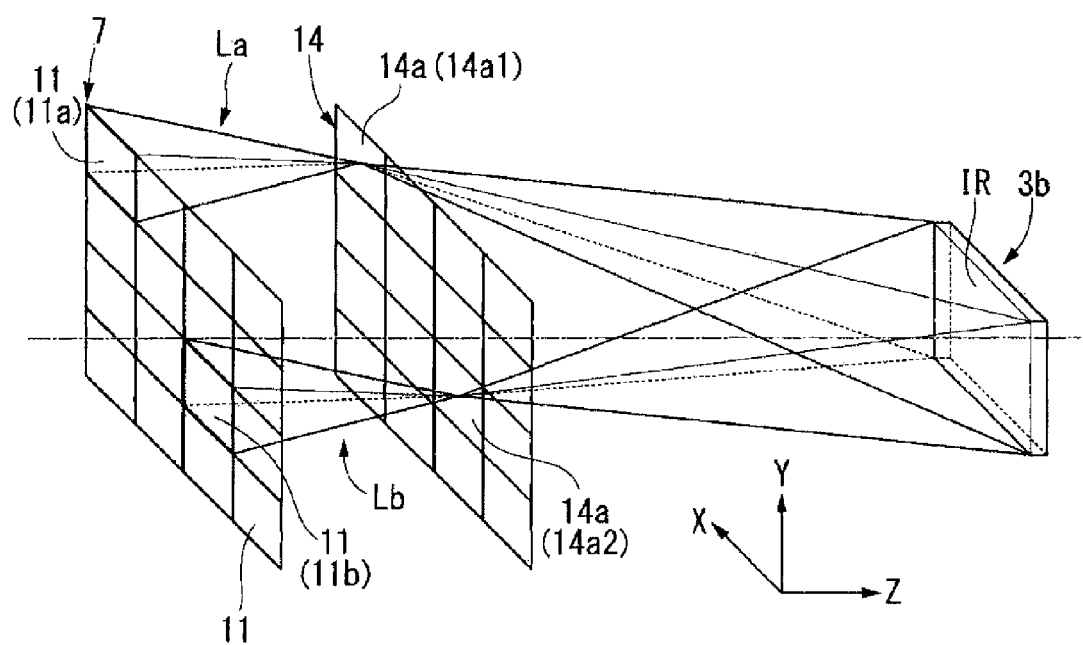
FIG. 4 is a diagram illustrating the principle of temporally changing an aperture function.

FIG. 4 is a diagram illustrating the principle of temporally changing the aperture function f(x,y) in this embodiment. For convenience of description, a plurality of light emission regions 11 of the light source device 7 correspond to a plurality of lens elements 14a of the fly-eye lens 14 on a one-to-one basis.

Light (hereinafter, referred to as a partial light flux La) emitted from the first light emission region 11a illuminates the entire illumination region IR through a first lens element 14a1. Light (hereinafter, referred to as a partial light flux Lb) emitted from the second light emission region 11b illuminates the entire illumination region IR through a second lens element 14a2.

It is assumed that the amount of light (the amount of cell light) of the partial light flux La is the same as the amount of light (the amount of cell light) of the partial light flux Lb, and the partial light flux La and the partial light flux Lb are alternately emitted. In this case, although there is no change in brightness in the illumination region IR, the position of the first light emission region 11a is different from the position of the second light emission region 11b, whereby the incident direction of light which enters the illumination region IR changes.

In this embodiment, the light source control device 10 shown in FIG. 2 temporally changes the combination of the laser light sources 12 which are in the turn-on state while switching the plurality of laser light sources 12 of the light source device 7 between the turn-on state and the turn-off state. Accordingly, the angular distribution of light entering each point on the illumination region IR temporally changes.

The laser light sources 12 and the lens elements 14a may not correspond to each other on a one-to-one basis. For example, light from one laser light source 12 may enter two or more lens elements 14a, and light from two or more laser light sources 12 may enter one lens element 14a.

Figure 5A:
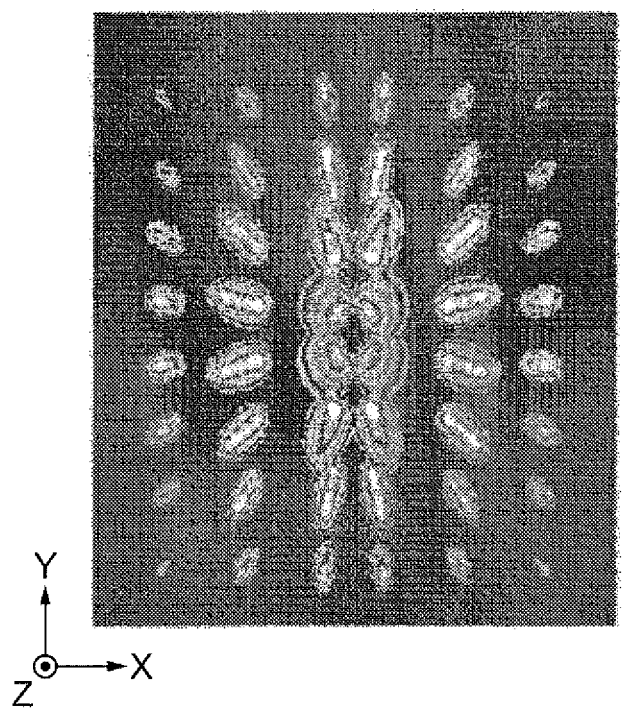
FIGS. 5A and 5B are diagrams showing an example of change in a pupil image when a laser light source is turned off.
Figure 5B:
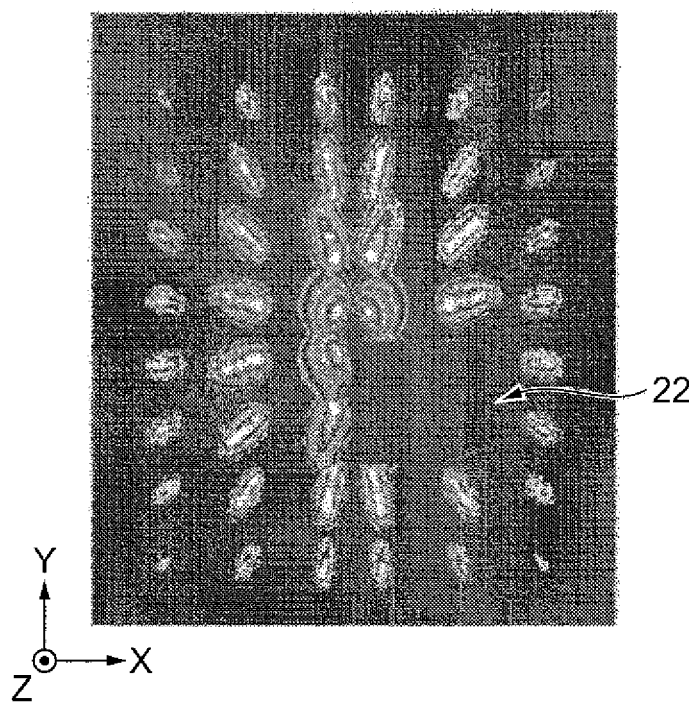

FIGS. 5A and 53 are diagrams showing an example of change in a brightness distribution (pupil image) in the second conjugate plane 21 when some laser light sources of a plurality of laser light sources 12 are turned off. FIG. 5A corresponds to a state where all of a plurality of laser light sources 12 are turned on, and FIG. 5B corresponds to a state where some laser light sources of a plurality of laser light sources 12 are turned off. Since the second conjugate plane 21 (the pupil plane of the projection system 4) and the light source image (fly-eye lens 14) are optically conjugated, and the brightness distribution (the distribution of spots) in the second conjugate plane 21 has a correspondence relationship with the brightness relationship in the fly-eye lens 14.

In a state where all of a plurality of laser light sources 12 are turned on, a light source image is formed in each of the lens elements 14a of the fly-eye lens 14. In a state where some laser light sources of a plurality of laser light sources 12 are turned off, the light source images resulting from the turned-off laser light sources 12 are not formed, whereby a dark portion 22 is formed in the second conjugate plane 21. In this way, the illumination device 2b selects at least one of a plurality of laser light sources 12, switches the selected laser light sources 12 between the turn-on state and the turn-off state, and temporally changes the laser light sources 12 to be selected, thereby effectively temporally changing the pupil image.

Next, an example of control by the light source control device 10 will be described. Here, control of several laser light sources 12 among a plurality of laser light sources 12 will be representatively described.

First Example of Control Method

Figure 6:
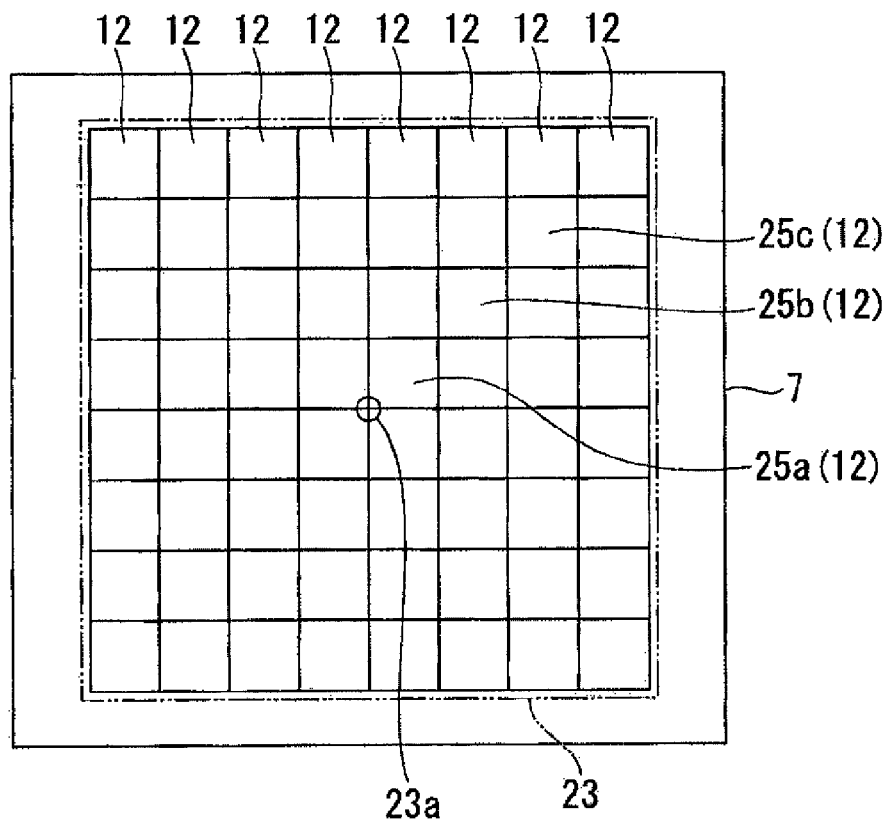
FIG. 6 is a diagram showing the arrangement of laser light sources to be controlled as described in a first example.
Figure 7:
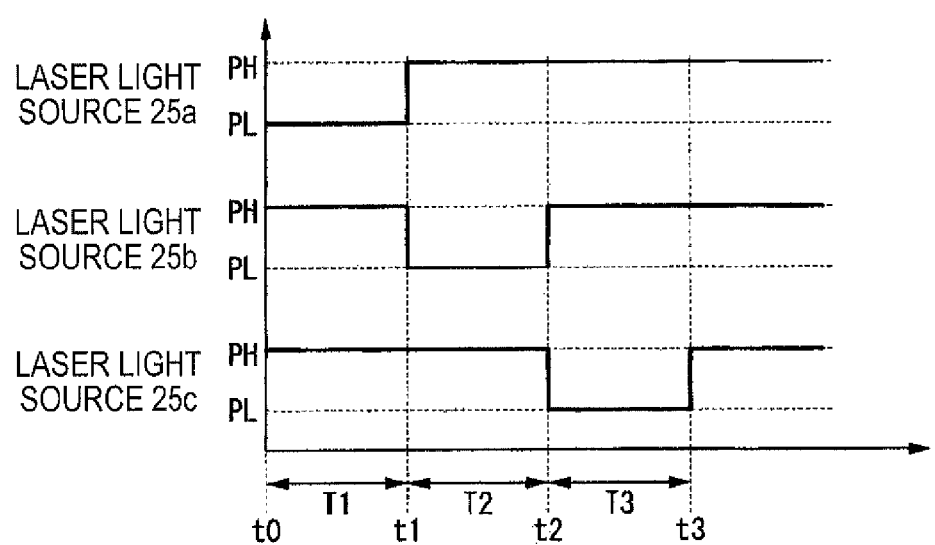
FIG. 7 is a timing chart showing a first example of control of laser light sources.

FIG. 6 is a diagram showing the arrangement of the laser light sources 12 to be controlled as described in a first example. FIG. 7 is a timing chart showing a first example of control of the laser light sources 12 by the light source control device 10. For convenience of description, it is assumed that the laser light sources 12 are arranged in a lattice shape in a light source arrangement area 23 of the light source device 7.

Reference numerals 25a to 25c of FIG. 6 denote laser light sources which are arbitrarily selected from a plurality of laser light sources 12 provided in the light source device 7. The laser light source 25a (first light emission region), the laser light source 25b (second light emission region), and the laser light source 25c are selected such that the distance from a center 23a of the light source arrangement area 23 differs.

In FIG. 7, the horizontal axis represents the time for which the light source device 7 is driven, and the vertical axis represents the level of power (current value) supplied to each of the laser light sources 25a to 25c. Reference numeral PH denotes the high level of supply power, and reference numeral PL denotes the low level of supply power. For example, the level PH is supply power at which the laser light source emits light with a predetermined amount of light, and the level PL is supply power (simply, 0) at which the laser light source does not emit light. The level PL may be supply power at which the laser light source emits light with a smaller amount of light than the amount of light obtained with the level PH.

For a period T1 (first period) from the time t0 to the time t1, the light source control device 10 maintains supply power to the laser light source 25a at the level PL, whereby the laser light source 25a is maintained in the turned-off state. The light source control device 10 maintains supply power to the laser light source 25b and the laser light source 25c at the level PH during the period T1, whereby the laser light source 25b and the laser light source 25c are maintained in the turn-on state.

The light source control device 10 switches supply power to the laser light source 25a to the level PH at the time t1 to turn on the laser light source 25a, and simultaneously switches supply power to the laser light source 25b to the level PL to turn off the laser light source 25b. For a period T2 (second period) from the time t1 to the time t2, the light source control device 10 maintains the laser light source 25a and the laser light source 25c in the turn-on state, and the laser light source 25b is maintained in the turn-off state. Similarly, during a period T3 (third period) from the time t2 to the time t3, the light source control device 10 maintains the laser light source 25a and the laser light source 25b in the turn-on state, and the laser light source 25c is maintained in the turn-off state.

As described above, the light source control device 10 controls the light source device 7 such that a combination (hereinafter, referred to as a turn-on pattern) of the laser light sources 12 in the turn-on state among a plurality of laser light sources 12 changes between the period T1 and the period T2. The length of each of the period T1 and the period T2 is set, for example, to be equal to or less than the time for which a human can perceive change in image, and may be equal to or less than 1/24 seconds or equal to or less than 1/30 seconds.

Since the light source control device 10 makes the turn-on pattern different between the period T1 and the period T2, the light source image formed on the fly-eye lens 14 has different patterns between the period T1 and the period T2. For this reason, the pupil image which is formed on the second conjugate plane 21 optically conjugated with the fly-eye lens 14 has different patterns between the period T1 and the period T2.

As a result, the angular distribution of light entering each point on the projection surface SC has different patterns between the period T1 and the period T2, and the pattern of speckle is different between the period T1 and the period T2. This is comparable to that the aperture function f (x, y) on the right side in Expression (1) temporally changes, whereby the amplitude distribution u (x', y') on the projection surface SC temporally changes. Since the patterns of speckle of the period T1 and the period T2 are visible to be temporally superimposed by the observer, speckle is less visible as a specific pattern.

Although FIG. 7 representatively shows supply power to the three laser light sources 25a to 25c, the light source control device 10 controls the light source device 7 such that the number of laser light sources 12 in the turn-on state among a plurality of laser light sources 12 is identical in the period T1 and the period T2. Accordingly, the amount of light emitted from the light source device 7 is substantially identical in the period T1 and the period T2, the illumination device 2b illuminates the illumination region TR (the image forming system 3) with the substantially same brightness in the period T1 and the period T2.

The number of laser light sources 12 which is maintained in the turn-off state at each time of a period, in which light is emitted from the light source device 7, may be one or may be two or more. The amount of light emission of the laser light source 12 to be turned on may be adjusted such that the amount of light emitted from the light source device 7 is substantially identical in the period T1 and the period T2, instead of making the number of laser light sources 12 in the turn-on state identical in the period T1 and the period T2. Furthermore, for example, the illumination device 2b may make the amount of light emitted from the light source device 7 different between the period T1 and the period T2 so as to expand the dynamic range.

In this example, since the light source control device 10 maintains the laser light sources at different distances from the center 23a of the light source arrangement area 23 in the turn-off state (or the turn-on state) at different timings among a plurality of laser light sources 12, it is possible to effectively change the angular distribution of light entering each point of the projection surface SC. A combination (turn-on pattern) of the laser light sources 12 maintained in the turn-on state for each period among a plurality of laser light sources 12 may be appropriately changed.

Second Example of Control Method

Figure 8:
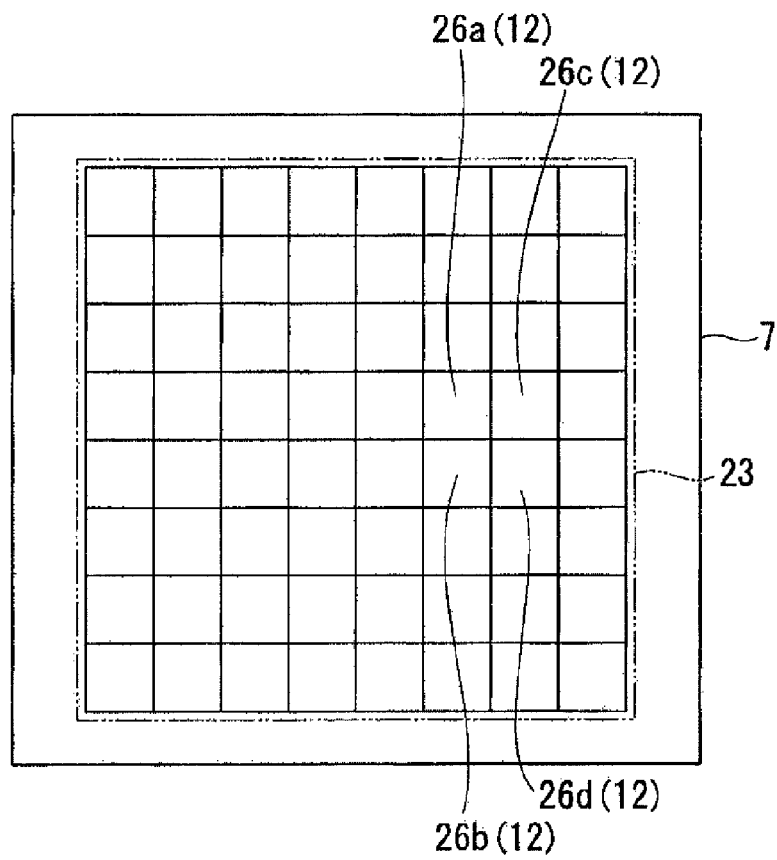
FIG. 8 is a diagram showing the arrangement of laser light sources to be controlled as described in a second example.
Figure 9:
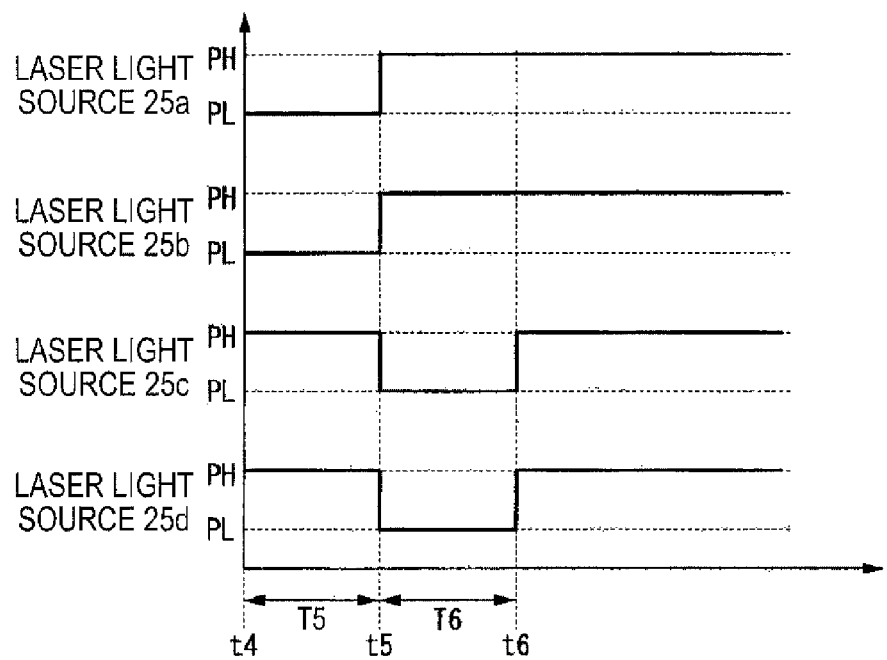
FIG. 9 is a timing chart showing a second example of control of laser light sources.

FIG. 8 is a diagram showing the arrangement of the laser light sources 12 to be controlled as described in a second example. FIG. 9 is a timing chart showing a second example of control of the laser light sources 12 by the light source control device 10.

Reference numerals 26a to 26d of FIG. 8 denote laser light sources which are arbitrarily selected from a plurality of laser light sources 12 provided in the light source device 7. The laser light source 26a (first light emission region) and the laser light source 26b are laser light sources adjacent to each other, and the laser light source 26c (second light emission region) and the laser light source 26d are laser light sources adjacent to each other.

The laser light source 26a and the laser light source 26b are aligned in the column direction of the arrangement of the laser light sources 12, and the laser light source 26c and the laser light source 26d are aligned in the column direction of the arrangement of the laser light sources 12. The laser light source 26a and the laser light source 26c are aligned in the row direction of the arrangement of the laser light sources 12, and the laser light source 26b and the laser light source 26d are aligned in the row direction of the arrangement of the laser light sources 12.

For a period T5 (first period) from the time t4 to the time t5, the light source control device 10 maintains the laser light source 26a and the laser light source 26b adjacent to each other in the turn-off state, and maintains the laser light source 26c and the laser light source 26d adjacent to each other in the turn-on state. At the time t5, the light source control device 10 turns on the laser light source 26a and the laser light source 26b, and turns off the laser light source 26c and the laser light source 26d. For a period T6 (second period) from the time t5 to the time t6, the light source control device 10 maintains the laser light source 26a and the laser light source 26b in the turn-on state, and maintains the laser light source 26c and the laser light source 26d adjacent to each other in the turn-off state.

In this example, since the light source control device 10 makes the turn-on pattern different between in the period T5 and in the period T6, speckle is less visible as a specific pattern by the observer. During transition from the period T5 to the period T6, since the light source control device 10 decreases or increases supply power to each of at least two adjacent laser light sources concurrently, it is possible to increase change in the light emission pattern of the light source arrangement area. For this reason, since change in the light intensity distribution of the pupil image in the second conjugate plane 21 of the projection system 4 increases, and change in the angular distribution of light entering each point on the projection surface SC, it is possible to effectively suppress visual recognition of speckle.

A light source group of laser light sources 12 which are collectively switched between the turn-on state and the turn-off state among a plurality of laser light sources 12 may include two or more laser light sources aligned in the row direction in the lattice arrangement, may include two or more laser light sources aligned in the column direction, or may include two or more laser light sources aligned in the circumferential direction around the center 23a shown in FIG. 6. If a light source group including two or more laser light sources aligned in the circumferential direction is collectively turned on or turned off, in the angular distribution of light entering each point on the projection surface SC, it is possible to increase change in an angular component which corresponds to the distance (diameter) from the center 23a of the light source arrangement area 23 shown in FIG. 6 to the light source group.

Third Example of Control Method

Figure 10:
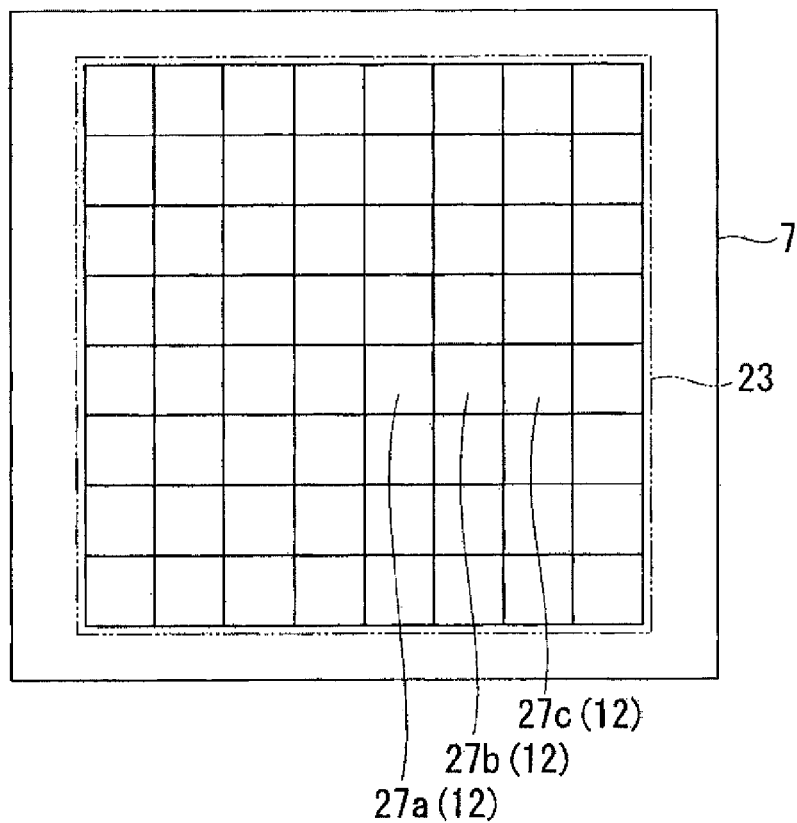
FIG. 10 is a diagram showing the arrangement of laser light sources to be controlled as described in a third example.
Figure 11:
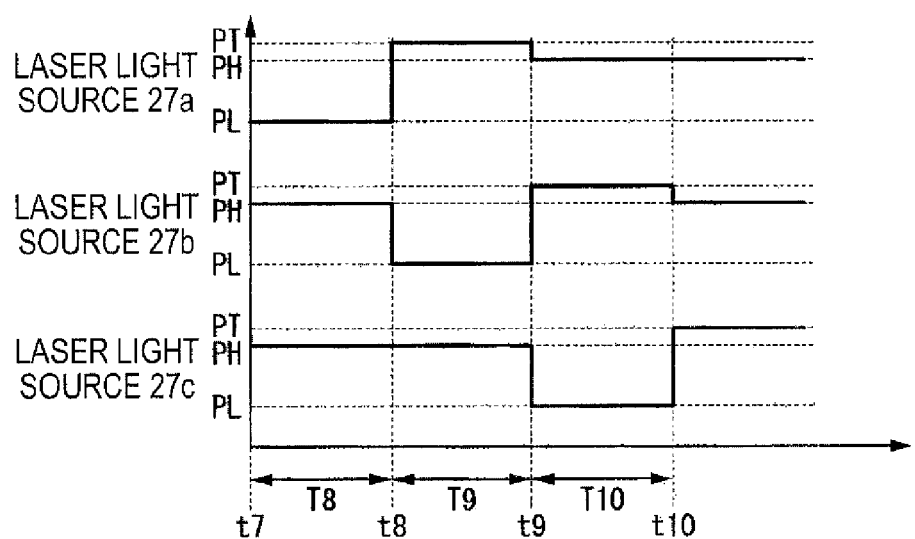
FIG. 11 is a timing chart showing a third example of control of laser light sources.

FIG. 10 is a diagram showing the arrangement of the laser light sources 12 to be controlled as described in a third example. FIG. 11 is a timing chart showing a third example of control of the laser light sources 12 by the light source control device 10.

Reference numerals 27a to 27c of FIG. 10 denote laser light sources which are arbitrarily selected from a plurality of laser light sources 12 provided in the light source device 7. The laser light source 27a (first light emission region) is arranged next to the laser light source 27b (second light emission region), and the laser light source 27c is arranged next to the laser light source 27b (on the opposite side to the laser light source 27a).

In FIG. 11, reference numeral PT is supply power at higher level than the level PH. For a period T8 (first period) from the time t7 to the time t8, the light source control device 10 maintains supply power to the laser light source 27a at the level PL, and maintains supply power to the laser light source 27b and the laser light source 27c at the level PH.

At the time t8, the light source control device 10 switches supply power to the laser light source 27a to the level PT, and switches supply power to the laser light source 27b to the level PL. During a period T9 (second period) from the time t8 to the time t9, the light source control device 10 maintains supply power to the laser light source 27a at the level PT, maintains supply power to the laser light source 27b at the level. PL, and maintains supply power to the laser light source 27c at the level PH.

At the time t9, the light source control device 10 switches supply power to the laser light source 27a to the level PH, switches supply power to the laser light source 27b to the level PT, and switches supply power to the laser light source 27c to the level PL. For a period T10 (third period) from the time t9 to the time t10, the light source control device 10 maintains supply power to the laser light source 27a at the level PH, maintains supply power to the laser light source 27b at the level PT, and maintains supply power to the laser light source 27c at the level PL.

Although FIG. 11 representatively shows supply power to the three laser light sources, during a period in which light is emitted from the light source device 7, the number of laser light sources having supply power at the level PH among a plurality of light sources is greater than the number of laser light sources having supply power at the level PL and is greater than the number of laser light sources having supply power at the level PT. That is, during a period in which light is emitted from the light source device 7, compared to the average value of supply power of a plurality of laser light sources 12, the level PT is a relatively high level of supply power, and the level PL is a relatively low level of supply power.

In other words, during the period T9, the light source control device 10 makes supply power for the laser light source 27b relatively low (the level PL) among a plurality of laser light sources 12, and makes supply power for the laser light source 27a adjacent to the laser light source 27b relatively high (the level PT) among a plurality of laser light sources 12.

For the period T9, while the amount of light emission of the laser light source 27b (supply power is at the level PL) becomes smaller than the amount of light emission of the laser light source 27c (supply power is at the level PH), the amount of light emission of the laser light source 27a (supply power is at the level PT) becomes greater than the amount of light emission of the laser light source 27c (supply power is at the level PH). For this reason, the light source device 7 can complement at least a part of the amount of decrease of the amount of light emission of the laser light source 27b with the amount of increase of the amount of light emission of the laser light source 27a.

Since the laser light source 27b having relatively low supply power has a smaller amount of heat generation than adjacent laser light sources 27a does, it is possible to secure heat dissipation when supply power of the laser light source 27a relatively increases. Since the laser light source 27b is cooled since supply power is relatively low during the period T9, high efficiency is obtained in the period T10, which follows the period T9, where supply power is increased to a relatively high level.

Fourth Example of Control Method

Figure 12:
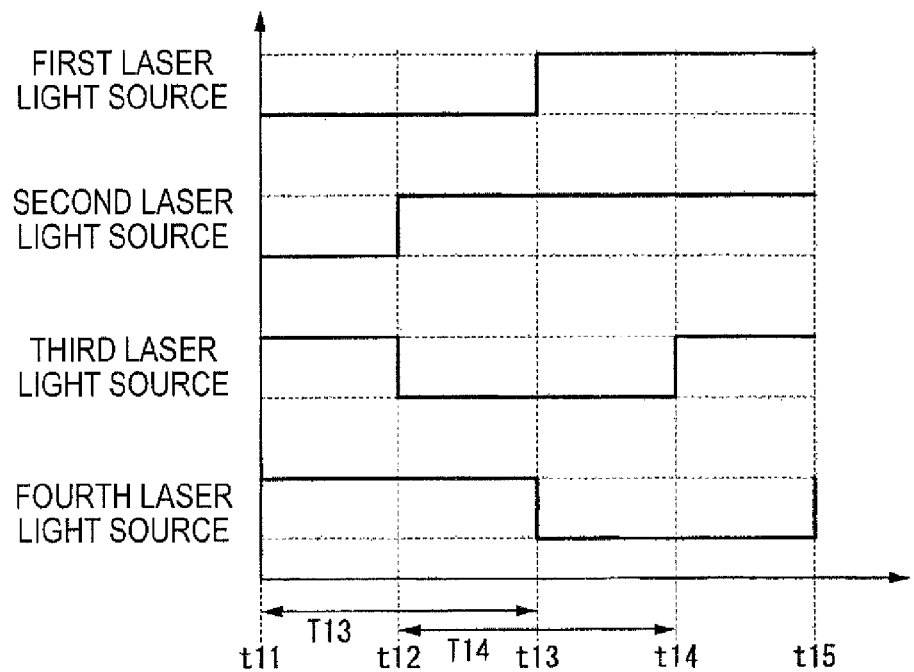
FIG. 12 is a timing chart showing a fourth example of control of laser light sources.

FIG. 12 is a timing chart showing a fourth example of control of the laser light sources 12 by the light source control device 10. In the fourth example, a period (first period) in which the amount of light emitted from the first laser light source is different from the amount of light emitted from either of other laser light source partially overlaps and does not partially overlap a period (second period) in which the amount of light emitted from the second laser light source is different from the amount of light emitted from either of other laser light sources. Hereinafter, the details will be described.

First, control of the first laser light source will be described. For a period T13 (first period) from the time t11 to the time t13, the light source control device 10 maintains supply power to the first laser light source at the level PL, and maintains the first laser light source in the turn-off state. At the time t13, the light source control device 10 switches supply power to the first laser light source to the level PH. For a period from the time t13, the light source control device 10 maintains the first laser light source in the turn-on state.

Next, control of the second laser light source will be described. For a period from the time t11 to the time t12, the light source control device 10 maintains the second laser light source in the turn-off state, and at the time t12, turns on the second laser light source. The time t12 is any time from the time t11 to the time t13, and for example, the time at the center of the period T13. For a period T14 (second period) for the time t12 to the time t14, the light source control device 10 maintains the second laser light source in the turn-on state. The time t14 is any time after the time t12 at which the first laser light source is switched from the turn-off state to the turn-on state, and is set such that the time t13 is the time at the center of the period T14.

Next, control of a third laser light source and a fourth laser light source will be described. The light source control device 10 maintains the third laser light source in the turn-on state during a period from the time t11 to the time t12, and maintains the third laser light source in the turn-off state during a period from the time t12 to the time t14. For a period from the time t14 to the time t15, the light source control device 10 maintains the third laser light source in the turn-on state. The light source control device 10 maintains the fourth laser light source in the turn-on state during the period T13 from the time t11 to the time t13, and maintains the fourth laser light source in the turn-off state during a period from the time t13 to the time t15.

In this way, during the period from the time t11 to the time t12 in the period T13 (first period), the first laser light source substantially has the same amount of light emission (in this case, 0) as the second laser light source, and has the amount of light emission different from the second laser light source during the period from the time t12 to the time t13 in the period T13. The second laser light source has the amount of light emission different from the first laser light source during the period from the time t12 to the time t13 in the period T14 (second period), and substantially has the same amount of light emission as the first laser light source during the period from the time t13 to the time t14 in the period T14.

It is assumed that the turn-on state of each laser light source is represented by 1, the turn-off state is represented by 0, and a turn-on pattern is expressed by a set of numerals indicating the turn-on states or the turn-off states of the first to fourth laser light sources in order, for example, (0,0,1,1). For example, during the period from the time t11 to the time t12, since the first laser light source is turned off (0), the second laser light source is turned off (0), the third laser light source is turned on (1), and the fourth laser light source is turned off (1), the turn-on pattern of this period is (0,0,1,1).

The turn-on pattern of the period from the time t12 to the time t13 is (0,1,0,1), the turn-on pattern of the period from the time t13 to the time t14 is (1,1,0,0), and the turn-on pattern of the period from the time t14 to the time t15 is (1,1,1,0). In this way, the turn-on pattern changes to four patterns from the time t11 to the t15. That is, in the first example, the second example, and the third example described above, while the frequency at which the turn-on pattern changes is the same as the frequency at which the amount of light emission of one laser light source changes, in a driving method of this example, it is possible to change the turn-on pattern at a frequency higher than the frequency at which the amount of light emission of one laser light source changes. For this reason, it is possible to effectively decrease contrast of speckle.

Fifth Example of Control Method

Figure 13:
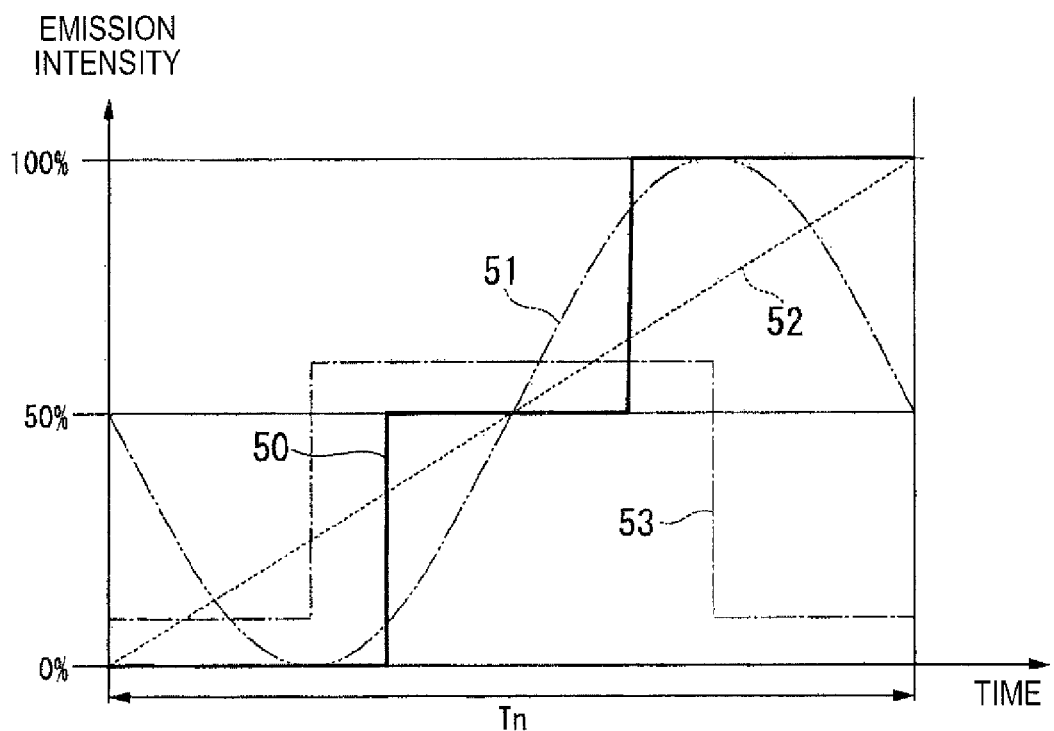
FIG. 13 is a diagram showing a fifth example of control of laser light sources.

FIG. 13 is a diagram showing a fifth example of control of the laser light sources 12 by the light source control device 10. In FIG. 13, the horizontal axis represents time, and the vertical axis represents normalized light emission intensity of a laser light source. In the first example to the fourth example, although supply power is controlled such that light emission intensity of one laser light source is substantially maintained at constant intensity within each period, in the fifth example, as shown in FIG. 13, supply power is controlled such that light emission intensity changes within a predetermined period.

The integrated value of light emission intensity of the laser light source during a period Tn is defined as the amount of light emission of the laser light source during the period Tn. In FIG. 13, an example where the amount of light emission during the period Tn is controlled to 50% of a predetermined amount of light emission is shown. The predetermined amount of light emission is, for example, the amount of light emission when 100% light emission intensity of the laser light source is maintained during the period Tn.

A graph 50 is an example where light emission intensity changes in a stepwise manner during the period Tn. For example, there are a period in which light emission intensity is 0%, a period in which light emission intensity is 50%, and a period in which light emission intensity is 100%, and when integrated, the amount of light emission during the period Tn is 50% of a predetermined amount of light emission. A graph 51 is an example where light emission intensity changes in a sinusoidal manner during the period Tn. A graph 52 is an example where light emission intensity changes in a linear manner during the period Tn. A graph 53 is an example where two light emission intensity levels other than 100% are set during the period Tn.

In this way, two or more different light emission intensity levels are used for a predetermined period, whereby two or more pupil images which are different in the amount of light of the angular component corresponding to light from one light source are sequentially formed. For this reason, it is possible to form more pupil images during the period Tn compared to a case where light is emitted with the same amount of light. Accordingly, it is possible to provide favorable image quality with speckle suppressed.

Sixth Example of Control Method

Figure 14:
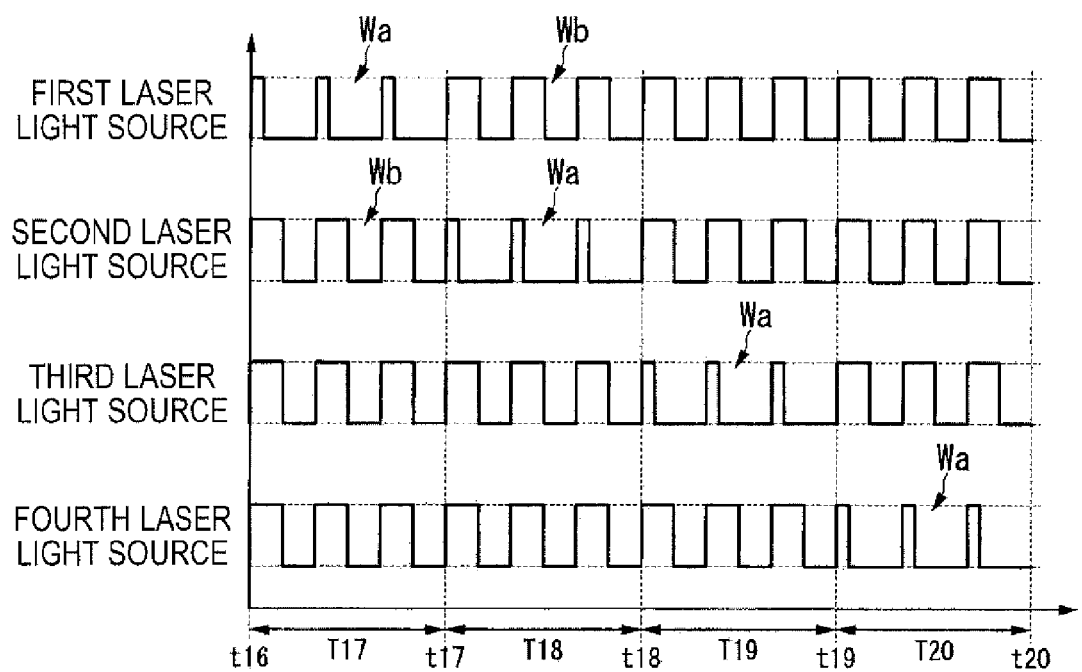
FIG. 14 is a timing chart showing a sixth example of control of laser light sources.

FIG. 14 is a timing chart showing a fifth example of control of the laser light sources 12 by the light source control device 10. Although the amount of light emission is changed by amplitude modulation in each example of the above-described control methods, the amount of light emission of the laser light source is changed by pulse width modulation in the sixth example.

As shown in FIG. 14, the first to fourth laser light sources are supplied with power represented by a pulsed waveform from the time t16 to the time t20. The first laser light source is supplied with power of a first waveform Wa including a plurality of pulses during a period T17 (first period) from the time t16 to the time t17, and is supplied with power of a second waveform Wb including a plurality of pulses during a period from the time t17 to the time t20. The first waveform Wa and the second waveform Wb substantially have the same amplitude and the same cycle, but are different in the pulse width. The pulse width of the first waveform Wa is smaller than the pulse width of the second waveform Wb. For this reason, supply power per unit time of the first waveform Wa is smaller than supply power per unit time of the second waveform Wb, and the first laser light source has the amount of light emission per unit time during the period T17 (the time-average value of the amount of light emission) smaller than the amount of light emission during the period from the time t17 to the time t20.

The light source control device 10 maintains supply power of the second laser light source at the second waveform Wb during the period from the time t16 to the time t17, maintains supply power of the second laser light source at the first waveform Wa during a period T18 (second period) from the time t17 to the time t18, and maintains supply power of the second laser light source at the second waveform Wb during a period from the time t18 to the time t20. For this reason, the amount of light emission of the second laser light source becomes greater than the amount of light emission of the first laser light source during the period T17, and becomes smaller than the amount of light emission of the first laser light source for the period T18.

The light source control device 10 maintains supply power of the third laser light source at the second waveform Wb during a period from the time t16 to the time t18, maintains supply power of the third laser light source at the first waveform Wa during a period from the time t18 to the time t19, and maintains supply power of the third laser light source at the second waveform Wb during a period from the time t19 to the time t20. The light source control device 10 maintains supply power of the fourth laser light source at the second waveform. Wb during a period from the time t16 to the time t19, and maintains supply power of the fourth laser light source at the first waveform Wa during the period from the time t19 to the time t20. In this way, even when the amount of light emission of the laser light source is controlled by pulse width modulation, speckle is less visible as a specific pattern by the observer.

Seventh Example of Control Method

Figure 15A:
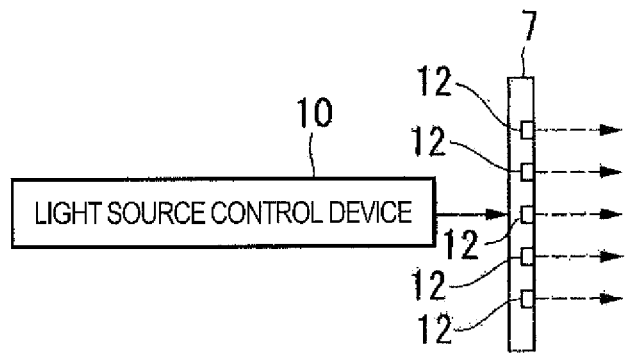
FIGS. 15A to 15C are diagrams showing a seventh example of control of laser light sources.
Figure 15B:
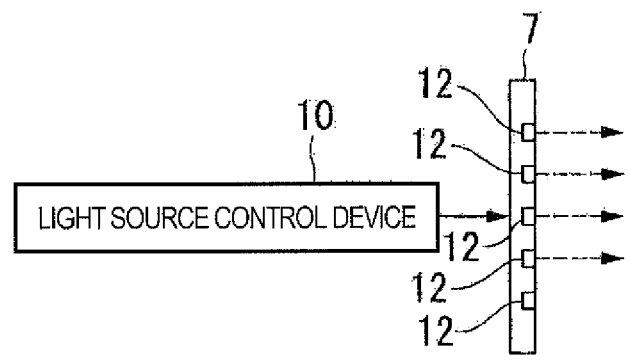
Figure 15C:
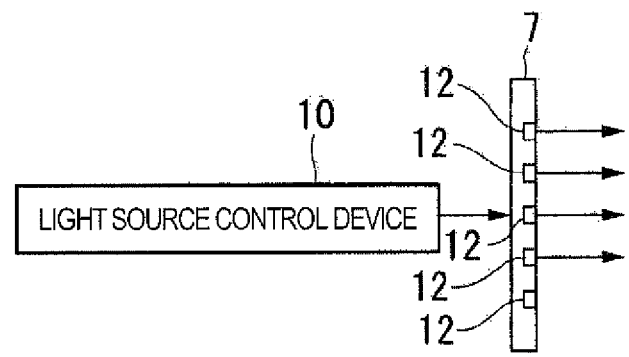

FIGS. 15A to 15C are diagrams showing a seventh example of control of the laser light sources 12 by the light source control device 10. In this example, when some laser light sources are turned off, the light source control device 10 increases supply power to other laser light sources so as to compensate the amount of decrease in the amount of light emitted from the light source device 7.

In a first state shown in FIG. 15A, each of five laser light sources 12 of the light source device 7 emits a predetermined amount of light. In a second state shown in FIG. 15B, four laser light sources 12 of the light source device 7 emit the predetermined amount of light, and one laser light source 12 is in the turn-off state.

If the predetermined amount of light is 1, the total amount of light (the reference amount of light) emitted from the light source device 7 in the first state of FIG. 15A is 5, and the total amount of light emitted from the light source device 7 in the second state of FIG. 15B is 4. That is, in the second state, the total amount of light (4) emitted from the light source device 7 decreases to be less than the reference amount of light (5).

Accordingly, as a third state shown in FIG. 15C, the light source control device 10 increases power supplied to at least one laser light source 12 in the turn-on state more than power supplied in the first state so as to compensate the amount of decrease (1) of the amount of light when the laser light source 12 is turned off. For example, the light source control device 10 increases supply power of the four laser light sources 12 in the turn-on state such that the amount of light emitted from the light source device 7 in the third state is substantially the same as the reference amount of light, that is, light which has an amount of light of 1.25 is emitted from each of the four laser light sources.

In this way, the turn-on state of a plurality of laser light sources 12 is switched between the first state and the third state, whereby speckle is less visible, and an image with no variation in brightness can be viewed.

The control methods of the foregoing examples can be appropriately combined with each other. For example, while collectively turning on or off two or more laser light sources aligned in the column direction as described referring to FIGS. 8 and 9, the amount of light emission of the laser light sources of a column adjacent to the column of the laser light sources in the turn-off state may increase as described referring to FIGS. 10 and 11.

In the foregoing embodiment, a transmission type liquid crystal light valve is used as the image forming apparatus 3b. In the transmission type liquid crystal light valve, in general, a light shielding layer (black matrix) which covers a peripheral portion of a pixel P is provided. Since the light shielding layer shields a part of illumination light, use efficiency of illumination light is degraded. For this reason, there is a case where the transmission type liquid crystal light valve is provided with a microlens for each pixel. However, when the refractive power of the microlens is large, a speckle reduction effect by temporally changing a pupil image may decrease. In this case, the image forming apparatus 3b includes an afocal optical system, thereby suppressing a decrease in the speckle reduction effect.

Figure 16:
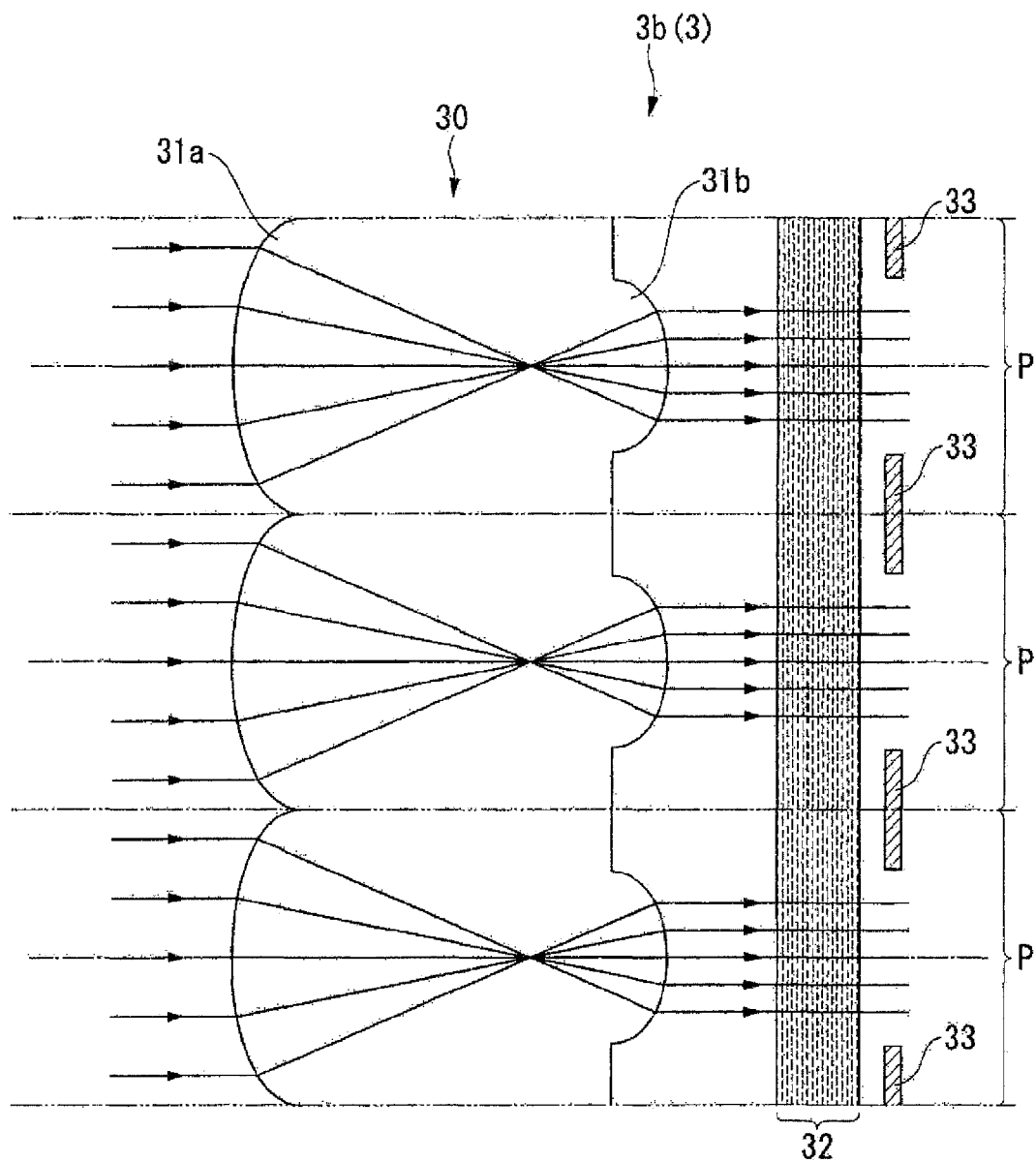
FIG. 16 is a diagram showing an example of an image forming apparatus.

A configuration example of the image forming apparatus 3b will be described. FIG. 16 is a diagram showing an example of the image forming apparatus 3b. The image forming apparatus 3b includes an afocal optical system 30, and the afocal optical system 30 includes a first microlens 31a and a second microlens 31b. In this example, the first microlens 31a and the second microlens 31b are a lens array provided on the same optical member, and the optical member is arranged on the entrance side of a liquid crystal layer 32.

The afocal optical system 30 of this example is of a so-called Kepler type, and the first microlens 31a and the second microlens 31b are convex lenses having positive power (refractive power). The first microlens 31a is provided on the entrance side of illumination light to the liquid crystal layer 32 for each pixel P. The second microlens 31b is arranged between the focal position of the first microlens 31a and the liquid crystal layer 32.

The image forming apparatus 3b includes a light shielding layer 33 (black matrix) which covers the peripheral portion of the pixel P, and the afocal optical system 30 reduces the beam diameter such that a light flux traveling toward the pixel P enters inside the pixel P. For this reason, in the image forming apparatus 3b, loss of light by the light shielding layer 33 decreases, and use efficiency of light increases.

Since the afocal optical system 30 converts a light flux entering each pixel P into a parallel light flux, it is possible to reduce the influence of the image forming apparatus 3b on the angular distribution of light passing through the image forming apparatus 3b. For this reason, it becomes easy to reflect the angular distribution of light to be temporally changed by the illumination device 2b in the pupil image on the second conjugate plane 21, thereby increasing the effect of making speckle be less visible.

Figure 17:
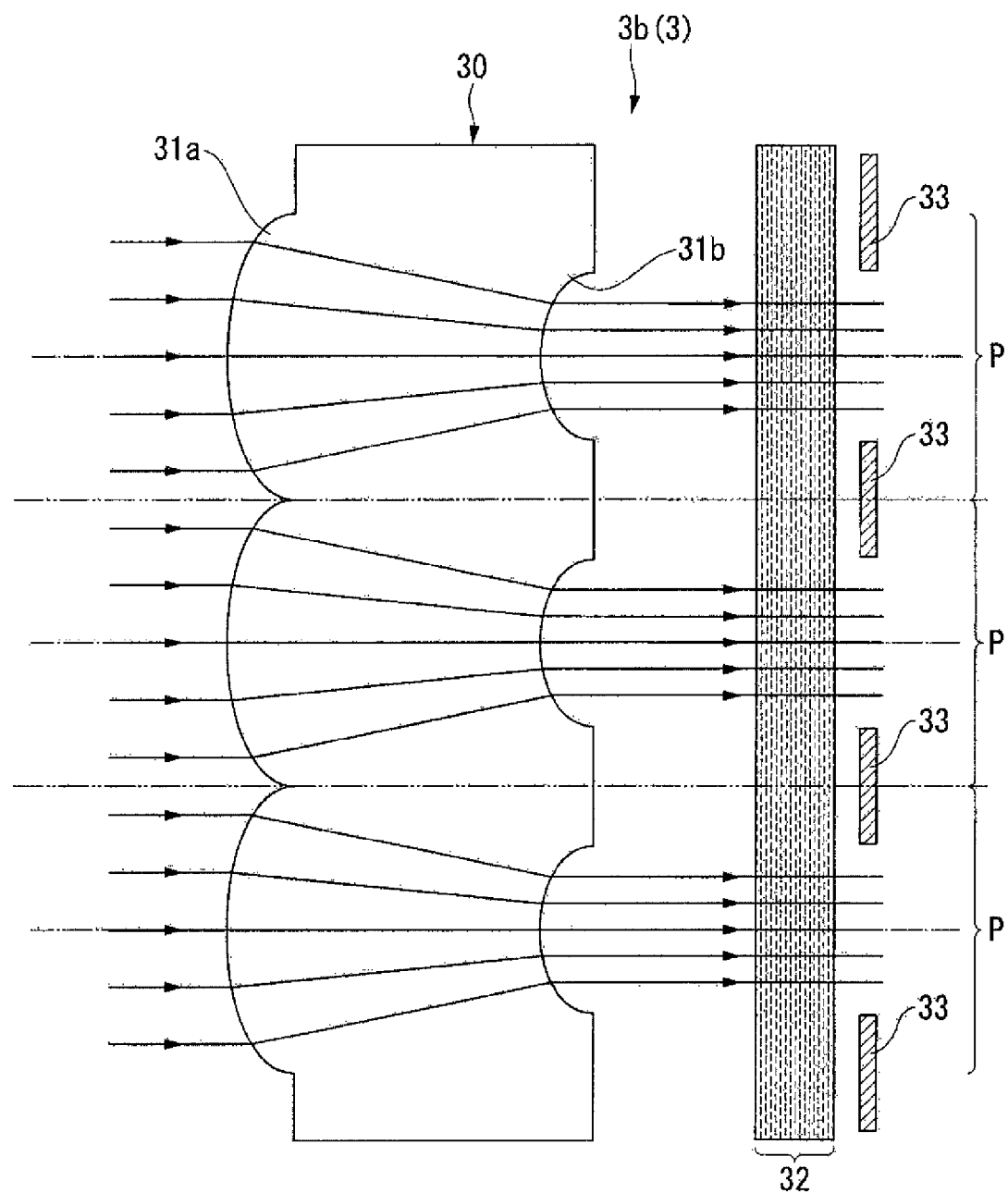
FIG. 17 is a diagram showing another example of an image forming apparatus.
Figure 18:
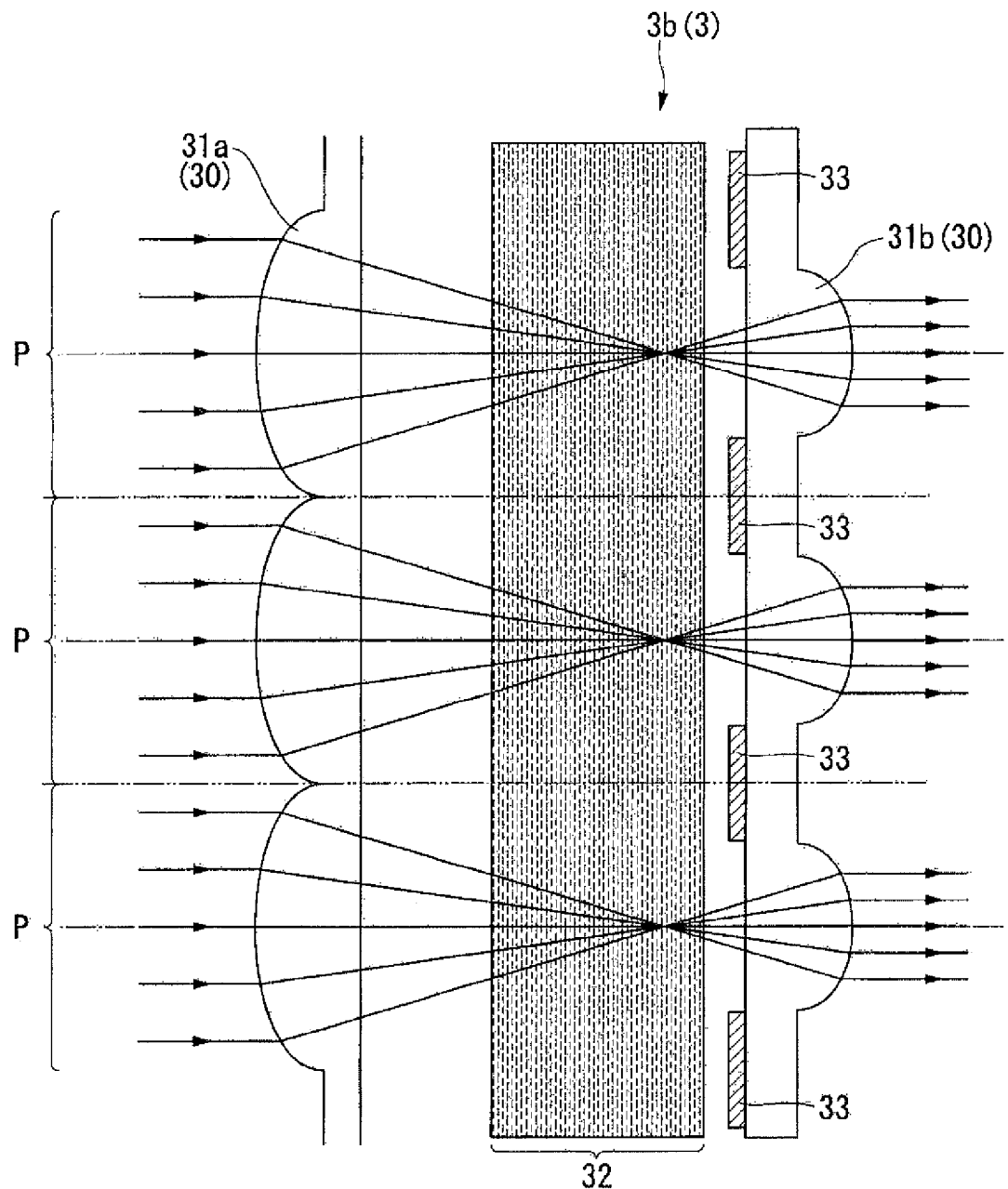
FIG. 18 is a diagram showing another example of an image forming apparatus.
Figure 19:
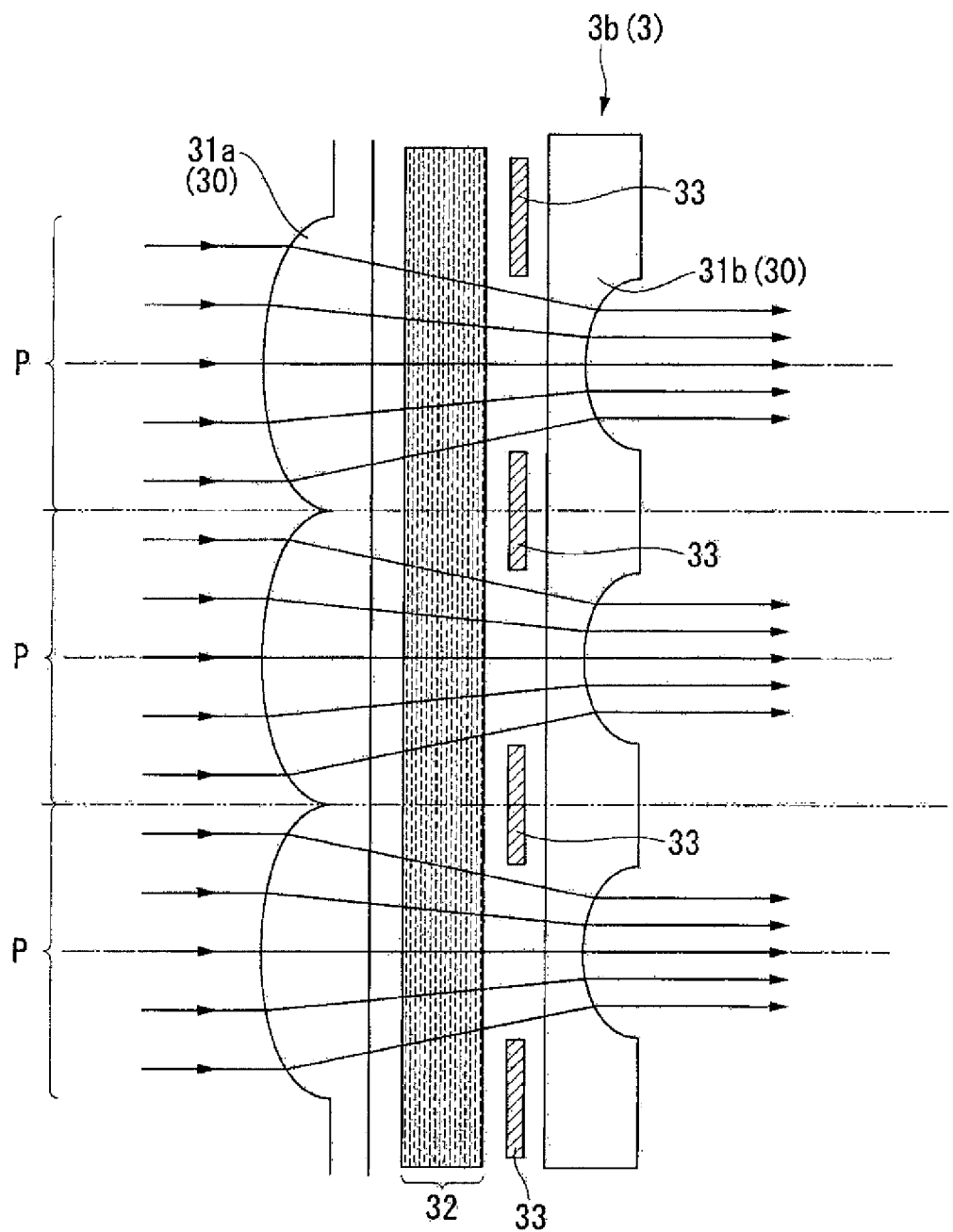
FIG. 19 is a diagram showing another example of an image forming apparatus.

FIGS. 17 to 19 are diagrams showing another example of the image forming apparatus 3b. In the image forming apparatus 3b shown in FIG. 17, the afocal optical system 30 is of a so-called Galileo type, the first microlens 31a is a convex lens having positive power, and the second microlens 31b is a concave lens having negative power. The Galileo type afocal optical system 30 can make the optical path length shorter than the Kepler type does.

In the image forming apparatus 3b shown in FIG. 18, the afocal optical system 30 is of a Kepler type, and the first microlens 31a and the second microlens 31b are convex lenses having positive power. In this example, the first microlens 31a and the second microlens 31b are a lens array provided in a separate optical member. The first microlens 31a is arranged on the entrance side of the liquid crystal layer 32, and for example, the focal position is arranged inside the liquid crystal layer 32. The second microlens 31b is arranged on the emission side of light of the liquid crystal layer 32.

When the Kepler type afocal optical system 30 is used, as in this example, the optical path between the first microlens 31a and the second microlens 31b is used as the installation space of the liquid crystal layer 32, whereby, for example, the image forming apparatus 3b can be reduced in thickness compared to the case in which the Galileo type afocal optical system is used. Since the Kepler type afocal optical system 30 easily reduces the beam diameter of light when passing through the aperture of the light shielding layer 33, it is easy to reduce loss of light in the light shielding layer 33.

In the image forming apparatus 3b shown in FIG. 19, the atonal optical system 30 is of a Galileo type, the first microlens 31a is a convex lens having positive power, and the second microlens 31b is a concave lens having negative power. The first microlens 31a is arranged on the entrance side of the liquid crystal layer 32, and the second microlens 31b is arranged on the emission side of the liquid crystal layer 32. The image forming apparatus 3b can be significantly reduced in thickness compared to, for example, the Kepler type.

In the illumination device 2b of this embodiment having the above-described configuration, since the turn-on pattern of the light source device 7 is temporally changed by the light source control device 10, it is possible to temporally change the pattern of the pupil image, and to effectively reduce speckle. In the projector 1 including the illumination device 2b, since speckle is less visible by the observer of the image, it is possible to suppress degradation of image display quality.

In the projector 1, since the pattern of the pupil image is temporally changed by a device (illumination device 2b) outside the projection system 4, it is possible to avoid an increase in size of the projection system 4 and an increase in cost. In the projector 1, since there is less need for expanding the effective diameter of the pupil plane of the projection system 4 compared to a system in which a pupil image having a fixed pattern is moved on the pupil plane of the projection surface SC, it is possible to avoid an increase in size of the projection system 4 and an increase in cost.

Second Embodiment

Figure 20:
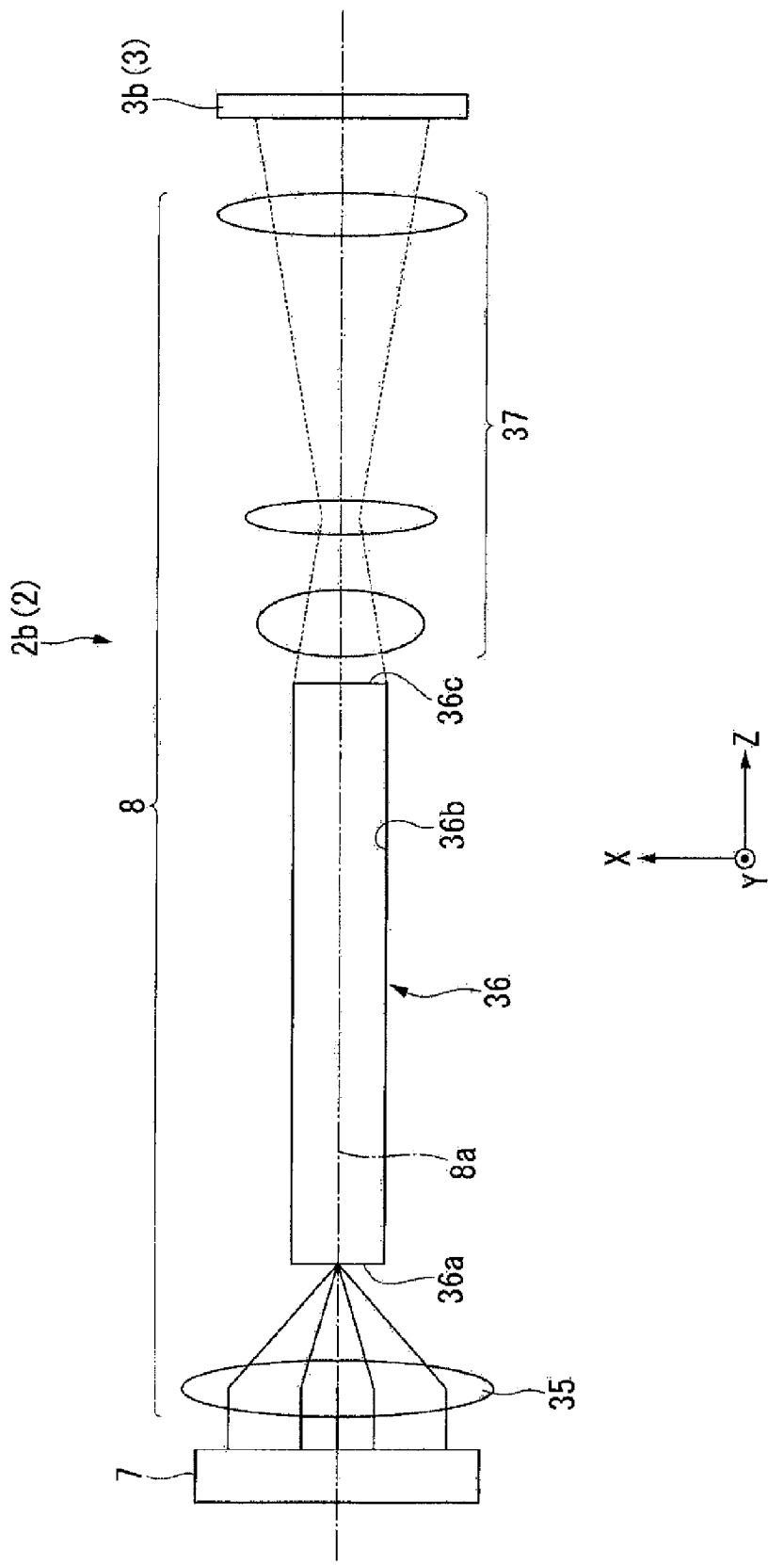
FIG. 20 is a diagram showing an illumination device and an image forming apparatus of a second embodiment.

A second embodiment will be described. FIG. 20 is a diagram showing an illumination device 2b and an image forming system 3 (image forming apparatus 3b) of the second embodiment. The illumination device 2b is different in the configuration of the illumination optical system 8 from the first embodiment. In this embodiment, the illumination optical system 8 includes an input lens 35, an optical rod 36, and a relay optical system 37.

The input lens 35 condenses light from the light source device 7 so as to converge on an entrance end surface 36a of the optical rod 36. The input lens 35 includes, for example, a lens which is axially symmetrical with respect to a predetermined axis, and the predetermined axis corresponds to an optical axis 8a of the illumination optical system 8.

Figure 21:
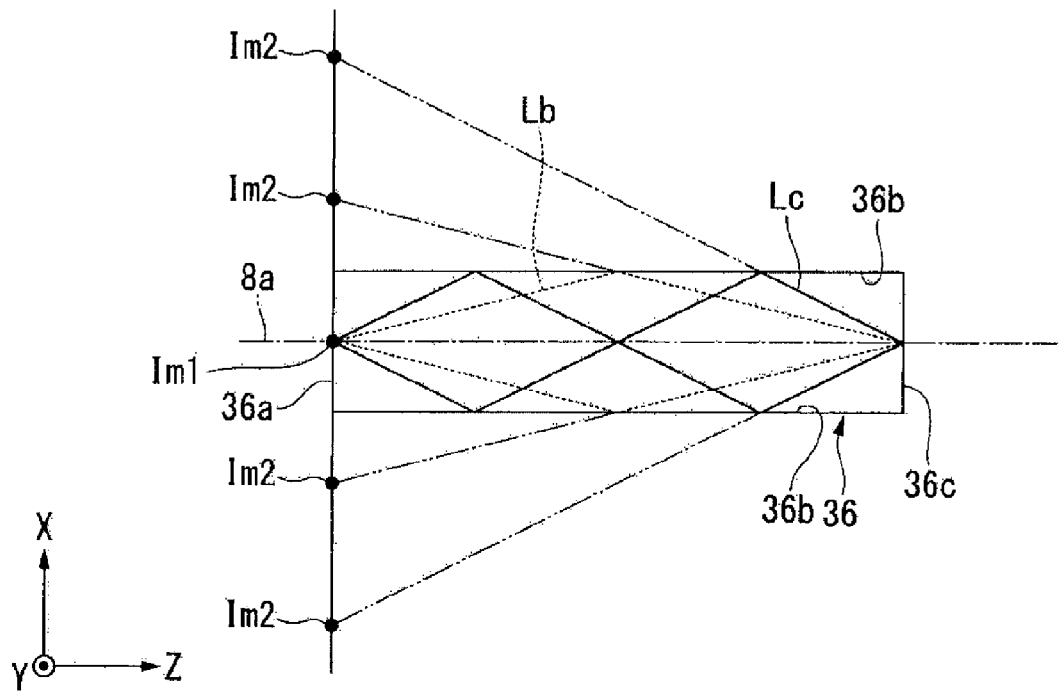
FIG. 21 is a diagram showing an optical rod.

FIG. 21 is a diagram showing the optical rod 36. The optical rod 36 is a so-called rod integrator or the like, and a square column-shaped optical member which is longitudinal in a direction parallel to the optical axis 8a of the illumination optical system 8. The optical rod 36 has an entrance end surface 36a, an inner surface 36b, and an emission end surface 36c. The entrance end surface 36a and the emission end surface 36c are substantially parallel to each other, and are substantially orthogonal to the optical axis 8a of the illumination optical system 8. The inner surface 36b is the inner surface of four lateral surfaces connecting the entrance end surface 36a and the emission end surface 36c, and is substantially parallel to the optical axis 8a of the illumination optical system 8.

The entrance end surface 36a is arranged, for example, at or near a position where a light source image is formed by the input lens 35. Light emitted from the light source device 7 enters the entrance end surface 36a through the input lens (see FIG. 20). The angular distribution of light when entering the entrance end surface 36a becomes a distribution which corresponds to the turn-on pattern of the laser light sources 12 (see FIG. 6) provided in the light source device 7.

For example, a component (wide-angle component) which has a relatively large divergence angle among light entering the entrance end surface 36a of the optical rod 36 corresponds to light which is emitted from the laser light source 12 at a position relatively away from the optical axis 8a (the center 23a of FIG. 6) of the illumination optical system 8 among a plurality of laser light sources 12. A component (telescopic component) which has a relatively small divergence angle among light entering the entrance end surface 36a of the optical rod 36 corresponds to light which is emitted from the laser light source 12 at a position relatively close to the optical axis 8a of the illumination optical system 8 among a plurality of laser light sources 12.

Light which has entered the entrance end surface 36a of the optical rod 36 is guided to the emission end surface 36c by multiple reflection in the inner surface 36b. The number of reflections in the inner surface 36b differs among the angular components, and the number of reflections of the wide-angle component is greater than the number of reflections of the telescopic component. A plurality of light fluxes, which are different in the number of reflections, including a light flux for which the number of reflections in the inner surface 36b is zero, a light flux Lb shown in FIG. 21 for which the number of reflections is one, a light flux Lc for which the number of reflections is two, and the like are superimposed on the emission end surface 36c of the optical rod 36, and accordingly, the illuminance distribution in the emission end surface 36c is made uniform.

Figure 22:
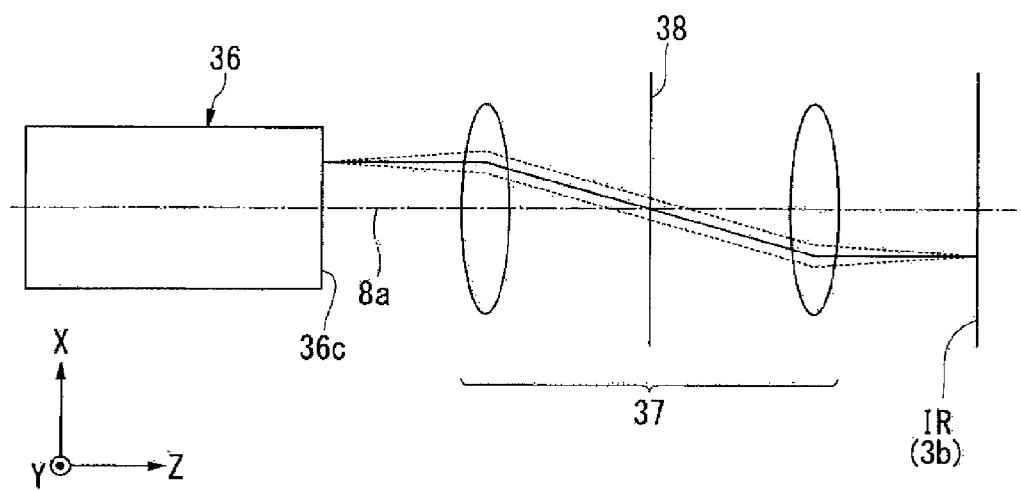
FIG. 22 is a diagram showing an optical rod and a relay optical system.

FIG. 22 is a diagram showing the optical rod 36 and the relay optical system 37. The relay optical system 37 forms a plane (illumination region IR) which is optically conjugated with the emission end surface 36c of the optical rod 36. Since the illuminance distribution of light from the light source device 7 is made uniform on the emission end surface 36c of the optical rod 36, the illuminance distribution is made uniform in the illumination region IR conjugated with the emission end surface 36c. In this way, the illumination optical system 8 superimposes the light fluxes from a plurality of light emission regions (laser light sources 12) of the light source device 7 in the illumination region IR, thereby uniformizing the illuminance distribution in the illumination region IR.

A third conjugate plane 38 (so-called pupil plane) which is conjugated with the light source image formed by the input lens 35 is formed in the relay optical system 37. The third conjugate plane 38 is optically conjugated with the second conjugate plane 21 of the projection system 4 shown in FIG. 2. The illumination device 2b temporally changes the pattern of spots in the third conjugate plane 38, thereby temporally changing the pattern of the pupil image in the second conjugate plane 21 of the projection system 4.

Figure 23:
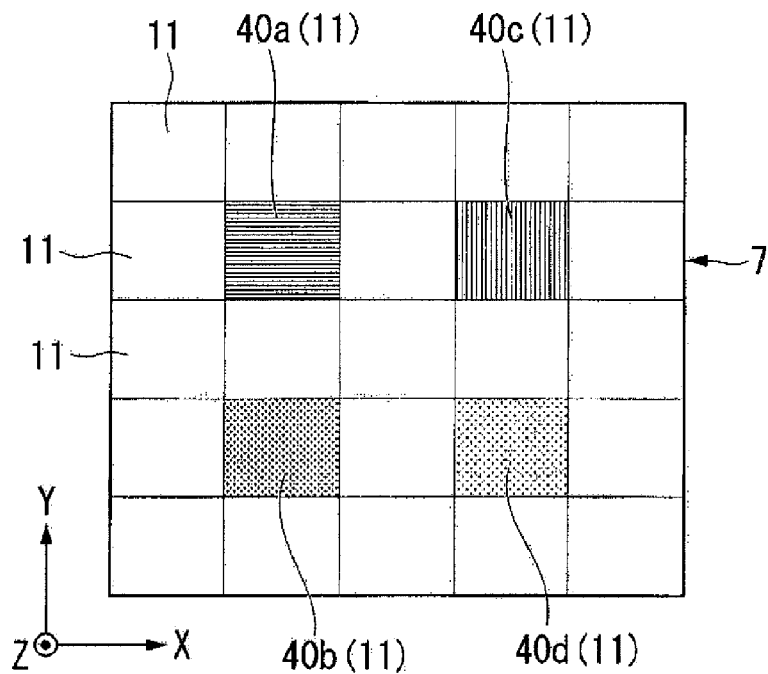
FIG. 23 is a diagram showing an example of a turn-on pattern of light source devices.
Figure 24:
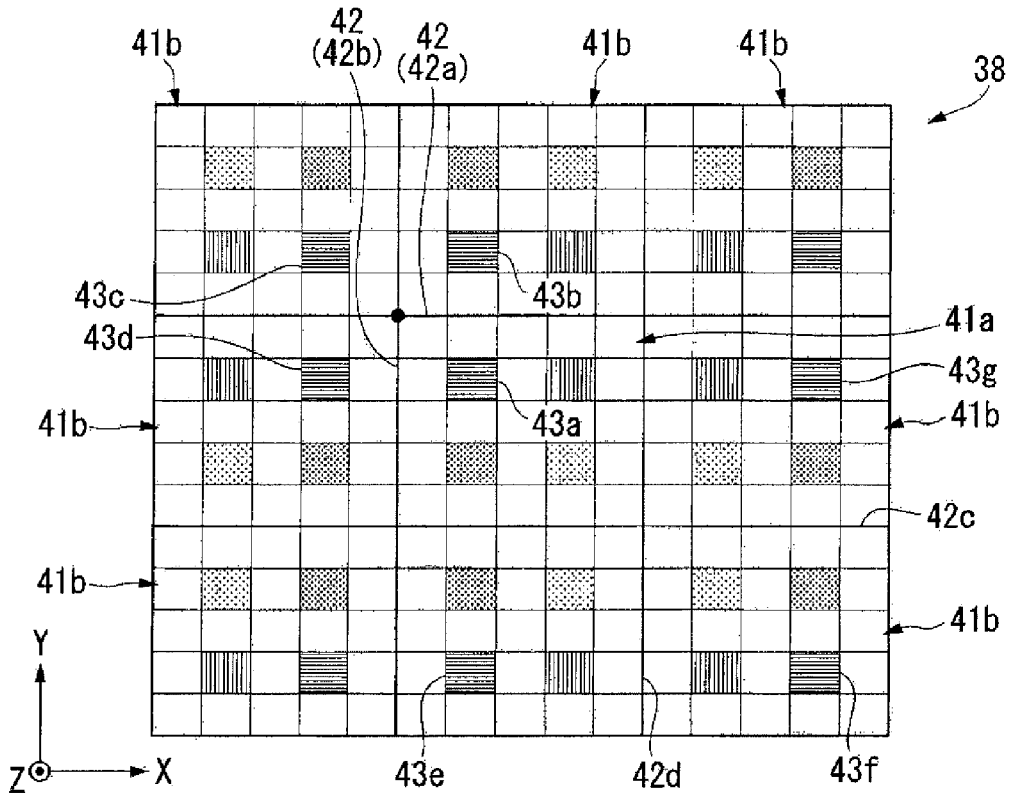
FIG. 24 is a diagram showing a light source image on a third conjugate plane corresponding to the turn-on pattern of FIG. 23.

FIG. 23 is a diagram showing an example of the turn-on pattern of the light source device 7. FIG. 24 is a diagram showing the pattern (light source image) of spots formed in the third conjugate plane 38 corresponding to the turn-on pattern of FIG. 23. For example, the turn-on pattern shown in FIG. 23 is substantially the same pattern as the light source image at or near the position of the entrance end surface 36a of the optical rod 36. In FIG. 23, reference numerals 40a to 40d denote a plurality of light emission regions 11 of the light source device 7.

As shown in FIG. 21, a plurality of light fluxes which are different in the number of reflections in the inner surface 36b enter each point of the emission end surface 36c of the optical rod 36. For this reason, when observing from the emission side of the optical rod 36, it appears that a real image Im1 and a plurality of imaginary images Im2 of the light source image are arranged on a surface including the entrance end surface 36a. In this example, since the third conjugate plane 38 substantially has a conjugate relationship with the entrance end surface 36a, a pattern 41a corresponding to the real image Im1 and a plurality of patterns 41b corresponding to the imaginary images Ia2 shown in FIG. 24 are arranged on the third conjugate plane 38. The pattern 41a and the patterns 41b are patterns (mirror image, inverted image) line-symmetric with respect to a boundary 42 corresponding to the inner surface 36b of the optical rod 36.

It is assumed that a region 43a which is conjugated with the light emission region 40a on the third conjugate plane is arranged near a boundary 42a and a boundary 42b intersecting each other. A region 43b symmetrical to the region 43a with respect to the boundary 42a, a region 43c symmetrical to the region 43b with respect to the boundary 42b, and a region 43d symmetrical to the region 43c with respect to the boundary 42a are regions which are conjugated with the light emission region 40a. A region 43e symmetrical to the region 43a with respect to the boundary 42c, a region 43f symmetrical to the region 43e with respect to a boundary 42d, and a region 43g symmetrical to the 43f with respect to the boundary 42c are regions which are conjugated with the light emission region 40a. For this reason, if the amount of light emitted from the light emission region 40a changes, brightness of a number of regions (in the example of FIG. 24, nine regions) collectively changes. Accordingly, change in the pattern of the light source image on the third conjugate plane 38 increases.

As described in the first embodiment, since the illumination device 2b of this embodiment temporally changes the turn-on pattern of the light source device 7, speckle is less visible by the observer. Since each light emission region 11 (for example, the light emission region 40a) of the light source device 7 has a correspondence relationship with a plurality of regions on the third conjugate plane 38, it is possible to increase change in the pattern of the light source image on the third conjugate plane 38 compared to change in the turn-on pattern of the light source device 7, and to effectively reduce speckle.

The technical scope of the invention is not limited to the foregoing embodiments. The requirements described in the foregoing embodiments can be appropriately combined. At least one of the requirements described in the foregoing embodiments may be omitted.

In the foregoing embodiments, although the illumination device is provided for each image forming apparatus, a single illumination device may be provided for a plurality of image forming apparatuses. For example, the illumination device may be configured to separate each color light component from light (simply, white light) including a plurality of color light components and to guide each color light component to the image forming apparatus for each color. As a light source device which generates white light, for example, a laser light source which emits red laser light, a laser light source which emits green laser light, and a laser light source which emits blue laser light may be provided, and laser light of the respective colors may be composed by a dichroic prism or a dichroic mirror. A light source device which generates white light may include a solid-state light source, such as a light emitting diode, a short-arc lamp light source, such as a metal halide lamp, or the like.

As a light source device which is able to adjust the amount of light emitted from each light emission region, a device which includes a light source and an optical path shift unit temporally shifting the optical path of light from the light source may be used. This light source device may include, for example, a light source, a polarization adjustment unit (for example, a liquid crystal device) which is able to adjust the polarization state of light from the light source, and a polarization conversion element which light passing through the polarization adjustment unit enters.

At least a part of the illumination optical system 8 may be provided as a part of the light source device 7. For example, in the illumination device 2b shown in FIG. 2, the light source device 7 may be an optical unit which includes the fly-eye lens 13 and the fly-eye lens 14. In this case, the light source device 7 adjusts the amount of light emission of the laser light source 12, thereby adjusting the amount of light emitted from each lens element 14a of the fly-eye lens 14. For this reason, in the light source device 7, each lens element 14a of the fly-eye lens 14 corresponds to the light emission region.

In the foregoing embodiments, although the projector 1 includes three transmissive liquid crystal light valves, a projector of different type in which images of respective colors are projected sequentially, the images of the respective colors are temporally integrated, and the integrated image expressing a full color image is observed may be possible. The number of colors displayed on the projector 1 is not limited, and a monochromic image may be displayed or an image may be displayed using two or four or more color light components instead of expressing a full color image using color light components of three colors (three channels).

An optical modulator which is used in the image forming apparatus may be a reflection type liquid crystal device, a digital mirror device, or the like, instead of the transmissive liquid crystal device. The optical modulator may be a light valve by a high temperature poly-silicon (HTPS) technique, a liquid crystal on silicon (LCOS) technique, or the like, or may not include the light shielding layer 33 (black matrix) shown in FIGS. 17 to 19. When an optical modulator other than the liquid crystal device is used as the optical modulator, the field lens 19 may be omitted.

The entire disclosure of Japanese Patent Application No. 2013-028285, filed on Feb. 15, 2013 is expressly incorporated by reference herein.

What is claimed is:

1. An illumination device comprising:
a light source device which has a plurality of light emission regions including a first light emission region and a second light emission region, and is able to adjust the amount of light emitted from each of the plurality of light emission regions;
a light source control device which controls the light source device such that, in a first period, the amount of light emitted from the first light emission region is different from the amount of light emitted from other light emission regions among the plurality of light emission regions, and in a second period, the amount of light emitted from the second light emission region is different from the amount of light emitted from the second light emission region in the first period; and
an illumination optical system which superimposes light from the plurality of light emission regions in an illumination region.

2. The illumination device according to claim 1,
wherein, in the first period, the intensity of light emitted from the first light emission region is set to at least two intensity levels.

3. The illumination device according to claim 1,
wherein the light source device includes a plurality of light sources, and
the light source control device makes the amount of light emission of at least one light source of the plurality of light sources different between the first period and the second period.

4. The illumination device according to claim 3,
wherein, in the first period, the light source control device decreases supply power to a first light source among the plurality of light sources and increases supply power to a second light source adjacent to the first light source among the plurality of light sources greater than supply power to other light sources among the plurality of light sources.

5. The illumination device according to claim 3,
wherein the light source control device decreases or increases supply power to at least two adjacent light sources among the plurality of light sources concurrently during transition from the first period to the second period.

6. The illumination device according to claim 3,
wherein, when the amount of light emitted from the light source device when predetermined power is supplied to each of the plurality of light sources is defined as a reference amount of light, power greater than the predetermined power is supplied to at least one light source other than a first light source among the plurality of light sources, when a first light source is turned off, so as to reduce the amount of decrease of the amount of light emitted from the light source device from the reference amount of light.

7. The illumination device according to claim 1,
wherein the light source control device controls the light source device such that the amount of light emitted from the plurality of light emission regions is identical in the first period and the second period.

8. The illumination device according to claim 1,
wherein each of the first period and the second period is equal to or smaller than $1/24$ seconds.

9. The illumination device according to claim 1,
wherein the light source device includes a solid-state light source which emits light having coherence.

10. The illumination device according to claim 1,
wherein the illumination optical system includes
a lens array which includes a lens element, which light from the light source device enters, and
a superimposing lens which superimposes light from the lens element on the illumination region.

11. The illumination device according to claim 1,
wherein the illumination optical system includes
an optical rod which has an entrance end surface, through which light from the light source device enters, and an emission end surface, through which light passing through the entrance end surface is emitted, and
a relay system which establishes an optically conjugate relationship between the emission end surface of the optical rod and the illumination region.

12. A projector comprising:
the illumination device according to claim 1;
an image forming system which forms an image using light from the illumination device; and
a projection system which projects the image formed by the image forming system.

13. A projector comprising:
the illumination device according to claim 2;
an image forming system which forms an image using light from the illumination device; and
a projection system which projects the image formed by the image forming system.

14. A projector comprising:
the illumination device according to claim 3;
an image forming system which forms an image using light from the illumination device; and
a projection system which projects the image formed by the image forming system.

15. A projector comprising:
the illumination device according to claim 4;
an image forming system which forms an image using light from the illumination device; and
a projection system which projects the image formed by the image forming system.

16. A projector comprising:
the illumination device according to claim 5;
an image forming system which forms an image using light from the illumination device; and
a projection system which projects the image formed by the image forming system.

17. A projector comprising:
the illumination device according to claim 6;
an image forming system which forms an image using light from the illumination device; and
a projection system which projects the image formed by the image forming system.

18. A projector comprising:
the illumination device according to claim 7;
an image forming system which forms an image using light from the illumination device; and
a projection system which projects the image formed by the image forming system.

19. A projector comprising:
the illumination device according to claim 8;
an image forming system which forms an image using light from the illumination device; and
a projection system which projects the image formed by the image forming system.

20. The projector according to claim 12,
wherein the image forming system includes
a first microlens which is provided for each of a plurality of pixels arranged in the illumination region, and
a second microlens which constitutes an afocal optical system along with the first microlens.

\* \* \* \* \*